(12) United States Patent
Choi et al.

(10) Patent No.: US 12,160,010 B2
(45) Date of Patent: Dec. 3, 2024

(54) POUCH-TYPE BATTERY CELL

(71) Applicant: SK Innovation Co., Ltd., Seoul (KR)

(72) Inventors: Yang Kyu Choi, Daejeon (KR); Seo Roh Rhee, Daejeon (KR); Young Sun Choi, Daejeon (KR); Eun Jeong Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 283 days.

(21) Appl. No.: 17/524,524

(22) Filed: Nov. 11, 2021

(65) Prior Publication Data

US 2022/0158280 A1     May 19, 2022

(30) Foreign Application Priority Data

Nov. 13, 2020    (KR) .................... 10-2020-0152191
Nov. 13, 2020    (KR) .................... 10-2020-0152192

(51) Int. Cl.
    *H01M 50/183*        (2021.01)
    *H01M 50/105*        (2021.01)
    *H01M 50/547*        (2021.01)

(52) U.S. Cl.
    CPC ....... *H01M 50/183* (2021.01); *H01M 50/105* (2021.01); *H01M 50/547* (2021.01)

(58) Field of Classification Search
    CPC ............ H01M 50/183; H01M 50/105; H01M 50/547; H01M 50/186; H01M 10/613;

(Continued)

(56) References Cited

U.S. PATENT DOCUMENTS 9,225,035 B1    12/2015   Werre et al.
2011/0091764 A1*   4/2011   Kim ................... H01M 50/105
                                              429/163

(Continued)

FOREIGN PATENT DOCUMENTS

KR     10-2009-0030202 A     3/2009
KR        20130014252 A   *   2/2013

(Continued)

OTHER PUBLICATIONS

English translation of KR20130014252A (Year: 2013).*

(Continued)

*Primary Examiner* — Ula C Ruddock
*Assistant Examiner* — Sarika Gupta
(74) *Attorney, Agent, or Firm* — IP & T GROUP LLP

(57) ABSTRACT

A pouch-type battery cell includes an electrode assembly, a pouch having at least one electrode accommodation portion accommodating the electrode assembly therein and a sealing portion for sealing the electrode assembly, and electrode leads electrically connected to the electrode assembly and exposed externally of the pouch through the sealing portion, wherein the electrode accommodation portion includes a body portion of which a width is greater than a height thereof, and an extension portion extending from a central portion of the body portion in a width direction to one side and having a width narrower than the width of the body portion, the electrode leads are disposed outside the extension portion in the width direction, and an end of the electrode leads has a height lower than an outer portion of the pouch.

18 Claims, 15 Drawing Sheets

(58) Field of Classification Search
CPC .......... H01M 10/6567; H01M 50/298; H01M 50/502; Y02E 60/10; Y02P 70/50
See application file for complete search history.

(56) References Cited

U.S. PATENT DOCUMENTS

| | | |
|---|---|---|
| 2011/0200866 A1 | 8/2011 | Yun et al. |
| 2012/0015226 A1 | 1/2012 | Kim et al. |
| 2013/0093398 A1* | 4/2013 | Takabayashi ....... H01M 50/178 429/185 |
| 2014/0050954 A1 | 2/2014 | Kim et al. |
| 2015/0037664 A1 | 2/2015 | Kang et al. |
| 2015/0180095 A1 | 6/2015 | Chen et al. |
| 2016/0013455 A1* | 1/2016 | Shiu ................ H01M 50/178 156/227 |
| 2018/0375077 A1 | 12/2018 | Shin et al. |
| 2019/0181505 A1* | 6/2019 | Otsuka ................ H01M 50/121 |
| 2019/0379032 A1 | 12/2019 | Park et al. |
| 2020/0243817 A1 | 7/2020 | Kwak et al. |
| 2020/0388805 A1 | 12/2020 | Yoo et al. |

FOREIGN PATENT DOCUMENTS

| | | |
|---|---|---|
| KR | 10-2015-0124124 A | 11/2015 |
| KR | 10-2017-0013809 A | 2/2017 |
| KR | 10-2018-0138027 A | 12/2018 |

OTHER PUBLICATIONS

Office Action for the U.S. Appl. No. 17/524,546 issued by the USPTO on May 23, 2023.
Office Action for U.S. Appl. No. 17/524,546 issued by the USPTO on Jul. 17, 2024.

* cited by examiner

B-B'

C-C'

POUCH-TYPE BATTERY CELL

CROSS-REFERENCE TO RELATED APPLICATION(S)

This application claims benefit of priority to Korean Patent Application No. 10-2020-0152191 filed on Nov. 13, 2020 and Korean Patent Application No. 10-2020-0152192 filed on Nov. 13, 2020 in the Korean Intellectual Property Office, the disclosure of which is incorporated herein by reference in its entirety.

BACKGROUND

1. Field

The present disclosure relates to a pouch-type battery cell for a secondary battery having an electrode assembly provided inside a pouch, and a battery module having the same.

2. Description of Related Art

Unlike primary batteries, secondary batteries may be charged and discharged, and thus may be applied to various fields such as digital cameras, mobile phones, notebook computers, hybrid vehicles, and electric vehicles. Examples of secondary batteries include a nickel-cadmium battery, a nickel-metal hydride battery, a nickel-hydrogen battery, and a lithium secondary battery.

Research into lithium secondary batteries having high energy density and discharge voltage, among the secondary batteries, have been conducted. Recently, lithium secondary batteries have been manufactured as pouch type battery cells having flexibility or square or cylindrical type battery cells having rigidity, and a plurality of battery cells may be electrically connected to be used. Here, the plurality of battery cells form a cell stack and may be disposed inside a module housing to form a battery module.

FIG. 1 is an exploded perspective view illustrating an example of a battery module 20 including a pouch-type battery cell 10 according to a related art, and FIG. 2 is a perspective view of the pouch-type battery cell 10 illustrated in FIG. 1, and FIG. 3 is a schematic view of the pouch-type battery cell 10 illustrated in FIG. 2.

Referring to FIG. 1, the battery module 20 according to the related art having the pouch-type battery cell 10 includes a plurality of pouch-type battery cells 10 stacked inside module housings 21 and 25. The module housings 21 and 25 include a lower plate 21 including a bottom portion 22 and a side wall portion 23 and having a shape with one side (e.g., upper side) opened and a cover plate 25 covering the opened side of the lower plate 21. The module housings 21 and 25 may have a tubular shape with two open ends, and the two open ends may be covered by an end plate 26. A bus bar assembly 30 may be provided between an end plate 26 and the stack of battery cells 10. The bus bar assembly 30 may include a bus bar (not shown), to which an electrode lead 15 is electrically connected, and a connection terminal 32 electrically connected to the bus bar and electrically connected externally. In addition, an opening 27 for exposing the connection terminal 32 externally may be formed in the end plate 26.

Referring to FIGS. 2 and 3, the pouch-type battery cell 10 of a related art may include an electrode assembly (not shown) including a positive electrode plate, a negative electrode plate, and a separator, and a pouch (casing) 11 surrounding the electrode assembly. The pouch 11 includes an electrode accommodation portion 12 forming a portion for accommodating the electrode assembly and sealing portions 13 (13a and 13b) formed by bonding peripheral portions of the pouch 11 along the periphery of the electrode assembly.

In addition, the pouch-type battery cell 10 includes the electrode lead 15 connected to an electrode plate (the positive electrode plate and the negative electrode plate) of the electrode assembly and outwardly protruding from the pouch 12 from two ends of the battery cell 10 in a width direction (a length direction) (a left-right direction in FIG. 3) and an insulating portion 15a for increasing sealing of the pouch 11 and securing an electrical insulating state in a position of the sealing portions 13a and 13b from which the electrode lead 15 is drawn out.

As illustrated in FIGS. 2 and 3, in the pouch-type battery cell 10 according to the related art, sealing portions 13a are formed at two ends (on both sides) in a width direction (in a length direction) and the electrode lead 15 extends outwardly from the sealing portion 13a. Accordingly, a width (length) L1 of a region A' in which the electrode plate (the positive electrode plate or the negative electrode plate) of the electrode assembly is located, corresponds to only a portion of a total width (length) L of the battery cell 10. That is, in the pouch-type battery cell 10 according to the related art, the width of an electrode plate does not include a width L2, which is the sum of a width L3 of the sealing portion 13a and a protruding length L4 of the electrode lead 15 at both ends of the battery cell. In the case of pouch-type battery cell 10, the width (length) L2 in which the electrode plate is not formed in the one side portion from which the electrode lead 15 is exposed is about 20 mm. In consideration of the fact that the electrode lead 15 connected to each of the positive electrode plate and the negative electrode plate is disposed on both sides of the battery cell 10, the electrode plate is not installed in a portion corresponding to the width (length) of about 40 mm with respect to the total width (length) L of the battery cell 10. In particular, in the pouch-type battery cell 10, the electrode plate is not installed by the certain width L2 at both ends of the battery cell 10, regardless of a height of the electrode lead 15 (e.g., regardless of a ratio of a height of the electrode lead to the overall height of the electrode assembly). Therefore, in the pouch-type battery cell 10 according to the related art, since the ratio of the portion of the total installation area of the battery cell in which the electrode plate is not installed is large, capacity loss may occur and energy density per unit volume of the battery cell cannot be sufficiently increased.

FIG. 4 is a schematic view illustrating a modified example of a pouch-type battery cell 10' according to the related art. FIG. 4 illustrates an example of the pouch-type battery cell 10' in which two electrode leads 15 are formed on one surface (an upper surface) of a pouch in the same direction.

Compared with the battery cell 10 illustrated in FIGS. 2 and 3 in which the electrode lead 15 protrudes from both sides of the pouch 11, in the battery cell 10' illustrated in FIG. 4, two electrode lead 15 protrude in the same direction from an upper surface sealing portion 13b. Therefore, in the pouch-type battery cell 10' illustrated in FIG. 4, an area A' in which the electrode plates (positive electrode plate and negative electrode plate) of the electrode assembly are installed may increase, compared with the battery cell 10 illustrated in FIGS. 2 and 3. That is, in the pouch-type battery cell 10' illustrated in FIG. 4, the electrode plate is not formed by a height H2' as the sum of a height H3' of the sealing portion 13b and a protrusion height H4' of the electrode lead 15 at one end (upper portion) of the battery cell in the overall height H, and thus, a ratio of the height H1' of the electrode plate to the overall height H' of the battery cell 10' may increase.

However, even in the case of the pouch-type battery cell 10' illustrated in FIG. 4, since the electrode plate is not disposed in a space between the two electrode leads 15, when a width of the battery cell increases, the space between the electrode leads also increases. Accordingly, since the entire area of the battery cell cannot be used efficiently, capacity loss occurs and there is a limit in improving energy density per unit volume.

Furthermore, in recent years, in battery systems for electric vehicles, battery modules are located on a vehicle floor (i.e., below a seat). In this case, as a height of the battery module is lowered, space utilization increases. Therefore, demand for a battery cell having a lower height and a longer width (length) has increased.

In addition, in terms of implementing an increase in overall electrical capacity, the long-width pouch-type battery cell 10 has been developed for various purposes, such as for vehicles, and demand for speed charging has gradually increased.

For speed charging, resistance of the battery cell should be lowered. In the case of the pouch-type battery cell 10, in order to lower resistance, the width of the electrode lead 15 (the height of the electrode lead in an up-down direction in FIGS. 2 and 3, and the length of the electrode lead in a horizontal direction) may be increased.

However, in the case of the pouch-type battery cell 10 according to the related art illustrated in FIGS. 2 and 3, since the electrode leads are exposed outwardly from both ends of the battery cell 10 in the width direction (length direction or left-right direction in FIG. 3), the width of the electrode lead 15 is inevitably smaller than the height of the battery cell 10. In particular, when the battery cell is configured as a module, the width of the electrode lead 15 needs to be sufficiently smaller than the height of the battery cell 10 because extra space is required for the electrode lead 15 to be connected to another component (e.g., a bus bar).

Considering this, in order to increase the width of the electrode lead 15 for the purpose of reducing resistance of the battery cell, it is necessary to increase the height of the battery cell 10, which, however, runs counter to the recent tendency of reducing the overall height of the battery module 20 (especially, in the case of a vehicle battery module, there are many restrictions on the height of the battery module).

Also, in the case of the battery cell 10' illustrated in FIG. 4, since the two electrode leads 15 are exposed in the same direction, there is a limitation in increasing the width of the electrode lead 15 (the length in the horizontal direction in FIG. 4).

As such, the pouch-type battery modules 10 and 10' according to the related art have low energy density per unit volume and have limitations in increasing the width of the electrode leads 15, and thus are not suitable for rapid charging.

SUMMARY

Various embodiments of the present disclosure provide a battery cell having improved energy density per unit volume and a battery module having the same.

Various embodiments of the present invention provide a battery cell suitable for rapid charging and a battery module having the same.

Various embodiments of the present invention provide a battery cell having improved energy density per unit volume, while lowering a height, and a battery module having the same.

According to an aspect of the present disclosure, a pouch-type battery cell includes: an electrode assembly in which a plurality of positive electrode plates and negative electrode plates are stacked with a separator interposed therebetween; a pouch having at least one electrode accommodation portion accommodating the electrode assembly therein and a sealing portion for sealing the electrode assembly in at least a portion of a periphery of the electrode accommodation portion; and electrode leads electrically connected to the electrode assembly and including a positive electrode lead and a negative electrode lead exposed externally of the pouch through the sealing portion, wherein the electrode accommodation portion includes a body portion of which a width is greater than a height thereof, and an extension portion extending from a central portion of the body portion in a width direction to one side and having a width narrower than the width of the body portion, the electrode leads are disposed outside the extension portion in the width direction, and an end of the electrode leads has a height lower than an outer portion of the pouch.

The sealing portion may include a first sealing portion formed on both side portions of the body portion of the electrode accommodation portion in the width direction and a second sealing portion formed on an upper portion of the electrode accommodation portion. In this case, the second sealing portion may be formed on both side portions of the extension portion in the width direction, an upper portion of the extension portion, and on upper portions of the body portion positioned on both sides of the extension portion in the width direction.

The at least one electrode accommodation portion may include two accommodation portions connected by a connecting portion disposed between the two electrode accommodation portions, the connecting portion may be folded and the electrode accommodation portions may face each other, the sealing portion may be formed in the periphery of the electrode accommodation portions by abutting portions of the electrode accommodation portions, and the sealing portion may not be formed in a folded portion in the periphery of the electrode accommodation portion.

The first sealing portion may include a first bending portion, bent at least once, and the second sealing portion may include a second bending portion, bent at least once, at an upper portion of the extension portion. In this case, an upper end of the electrode leads may have a height lower than a height of the second bending portion.

In addition, the second sealing portion may have a step shape formed between a portion formed at an upper portion of the body portion and a portion formed at an upper portion of the extension portion. In this case, the electrode leads may be exposed externally of the pouch through the second sealing portion formed at the upper portion of the body portion.

At least one of the first bending portion and the second bending portion may have a twice bent shape.

The width of the electrode accommodation portion may be greater than twice the height of the electrode accommodation portion.

A width of the pouch-type battery cell may be greater than twice a height of the pouch-type battery cell.

A width of the electrode leads may be equal to or greater than 20 mm and equal to or less than ⅓ of the width of the pouch-type battery cell.

A thickness of the electrode leads may range from 0.15 mm to 1 mm.

A width-directional distance from one end of the battery cell in the width direction to the extension portion may have a value equal to or smaller than an overall height of the pouch-type battery cell.

The positive electrode plate, the negative electrode plate, and the separator may each have a sheet shape and may be stacked to each other to form the electrode assembly, and each of the positive electrode plates may include a positive electrode tab protruding upwardly from an upper portion on one side in the width direction and connected to the positive electrode lead on one side, and each of the negative electrode plates may include a negative electrode tab protruding upwardly from an upper portion on the other side in the width direction and connected to the negative electrode lead on the other side. In this case, each of the positive electrode plates may include a positive electrode plate body portion having a width greater than a height and a positive electrode plate extension portion extending to one side from a central portion of the positive electrode plate body portion in the width direction and having a width narrower than that of the positive electrode plate body portion, and each of the negative electrode plates may include a negative electrode plate body portion having a width greater than a height and a negative electrode plate extension portion extending to one side from a central portion of the negative electrode plate body portion in the width direction and having a width narrower than that of the negative electrode plate body portion.

According to another aspect of the present disclosure, a pouch-type battery cell includes: an electrode assembly; a pouch enclosing the electrode assembly, the pouch including two identical electrode accommodation portions, a connecting portion connecting the accommodation portions, and a sealing portion sealing a periphery of the pouch around the electrode assembly; and positive and negative electrode leads exposed externally of the single film pouch through the sealing portion, wherein the pouch has a body portion of which a width is greater than a height of the body portion and an extension portion extending in a height direction from a central portion of the body portion in a width direction and having a width narrower than the width of the body portion, and wherein the electrode leads are extending in the height direction out from the body portion, and an upper end of each of the electrode leads is lower than an upper end of the extension portion of the pouch.

The connecting portion may be disposed centrally between the pair of electrode accommodation portions, and the electrode assembly may have a body portion and an extension portion having shapes that are complimentary to the shapes of the body portion and extension portion of the pouch, respectively, so that the electrode assembly is tightly enclosed inside the pouch.

According to another aspect of the present disclosure, a battery module includes: a cell stack formed by stacking a plurality of pouch-type battery cells described above; and a bus bar assembly having a conductive bus bar electrically connected to the electrode leads, wherein the bus bar is coupled to the electrode leads in an up-down direction of the battery cell.

The battery module may further include: a module housing having an internal space accommodating the battery cell and having a pipe shape with two open ends in a length direction, wherein an end plate may be coupled to the two open ends of the module housing.

BRIEF DESCRIPTION OF DRAWINGS

The above and other aspects, features, components of the present disclosure will be more clearly understood from the following detailed description, taken in conjunction with the accompanying drawings, in which:

FIGS. 8 to 13 are views illustrating an example of a process for manufacturing the pouch-type battery cell illustrated in FIG. 5, in which FIG. 8 is a perspective view illustrating a process in which the electrode assembly illustrated in FIG. 7 is stacked, coupled with electrode leads, and inserted into a pouch, FIG. 9 is a perspective view illustrating the process in which the pouch is folded in a state in which the electrode assembly and the electrode leads are accommodated in the pouch as a subsequent process of FIG. 8, FIG. 10 is a schematic diagram illustrating a side surface (large surface) in a state in which the pouch is folded, FIG. 11 is a schematic diagram illustrating a state in which a sealing portion is formed with respect to the pouch of FIG. 10, FIG. 12 is a schematic view illustrating a process of forming first and second bending portions in the sealing portion of FIG. 11, and FIG. 13 is a schematic view of a pouch-type battery cell in which the first and second bending portions are formed in FIG. 12 and illustrates a final state of an electrode lead;

DETAILED DESCRIPTION

Figure 1:
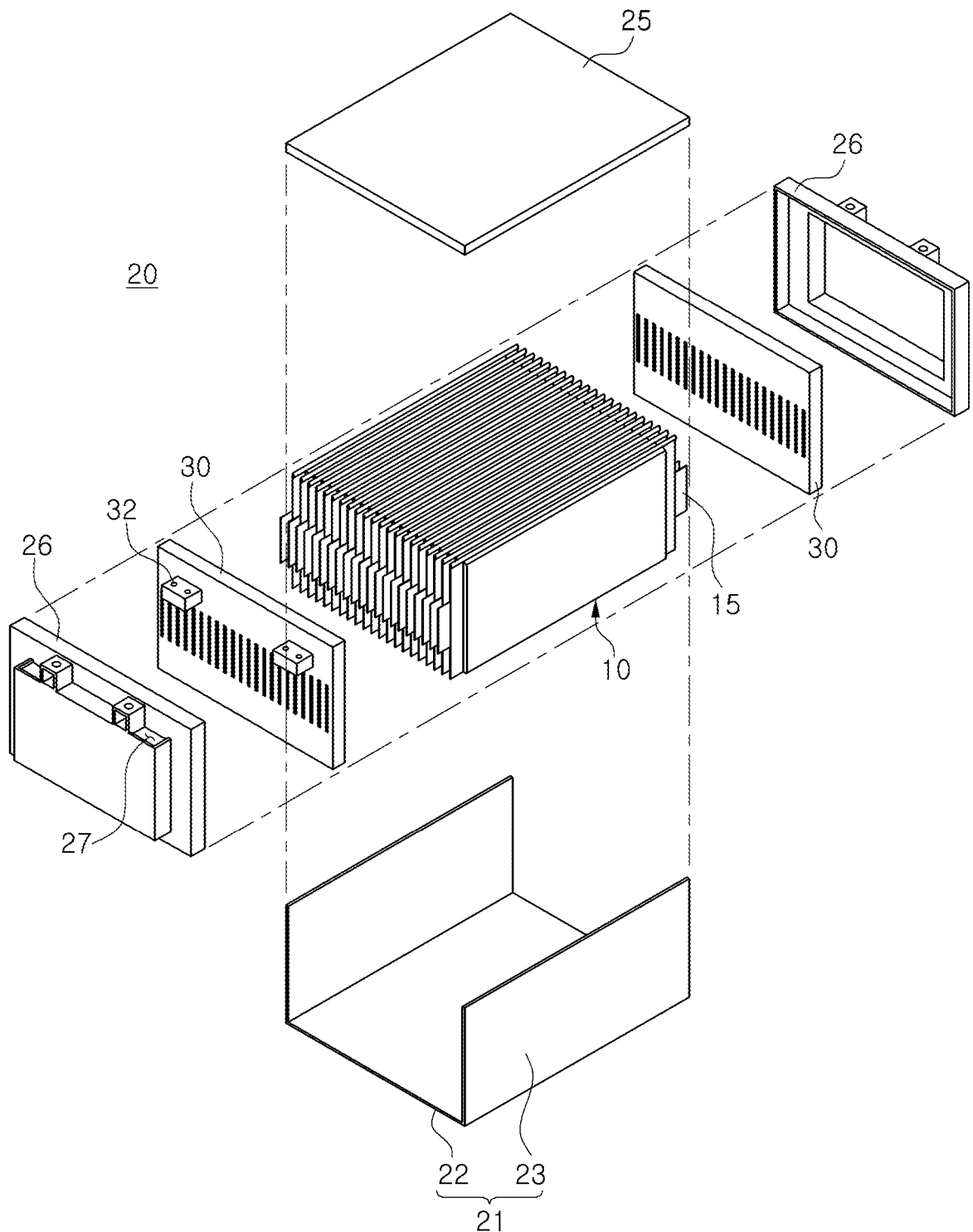
FIG. 1 is an exploded perspective view illustrating an example of a battery module having a pouch-type battery cell according to the related art.

Prior to the description of the present disclosure, terms and words used in the present disclosure and claims to be described below should not be construed as limited to ordinary or dictionary terms, and should be construed in accordance with the technical features of the present disclosure based on the principle that the inventors can properly define their own inventions in their own terms that best explain the invention. Therefore, the embodiments described in the present disclosure and the configurations illustrated in the drawings are merely embodiments of the present disclosure and are not intended to represent all of the technical features of the present disclosure, and thus should be understood that various equivalents and modifications may be substituted at the time of the present application.

Hereinafter, embodiments of the present disclosure will be described in detail with reference to the accompanying drawings. In this case, in the drawings, the same components are denoted by the same reference numerals/symbols. Further, the detailed description of well-known functions and constructions which may obscure the gist of the present disclosure will be omitted. For the same reason, some of the elements in the accompanying drawings are exaggerated, omitted, or schematically illustrated, and the size of each element may not reflect the actual size.

First, a pouch-type battery cell 100 according to an embodiment of the present disclosure will be described with reference to FIGS. 5 to 13.

Figure 5:
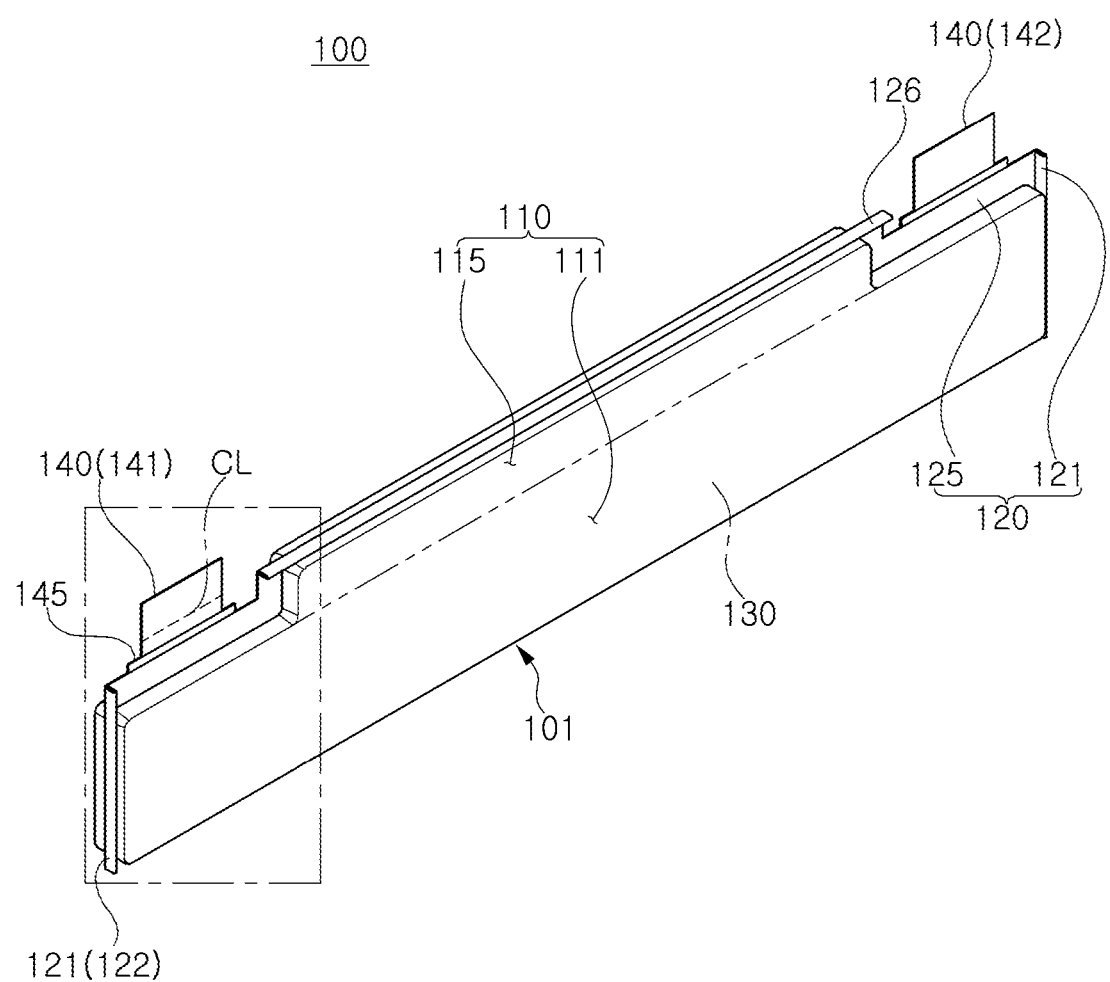
FIG. 5 is a perspective view illustrating a pouch-type battery cell according to an embodiment of the present disclosure.
Figure 6:
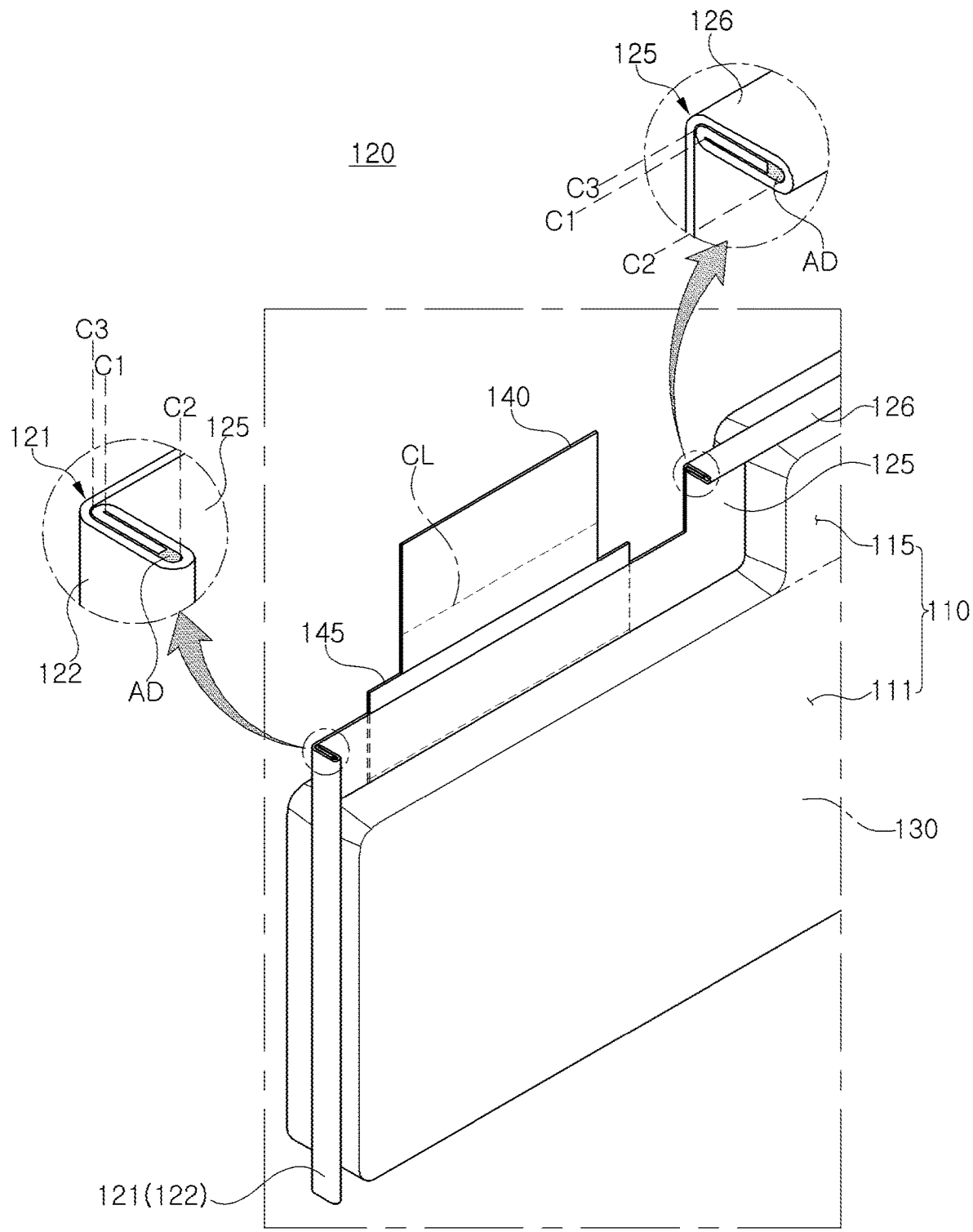
FIG. 6 is an enlarged view of a square box portion of FIG. 5.
Figure 7:
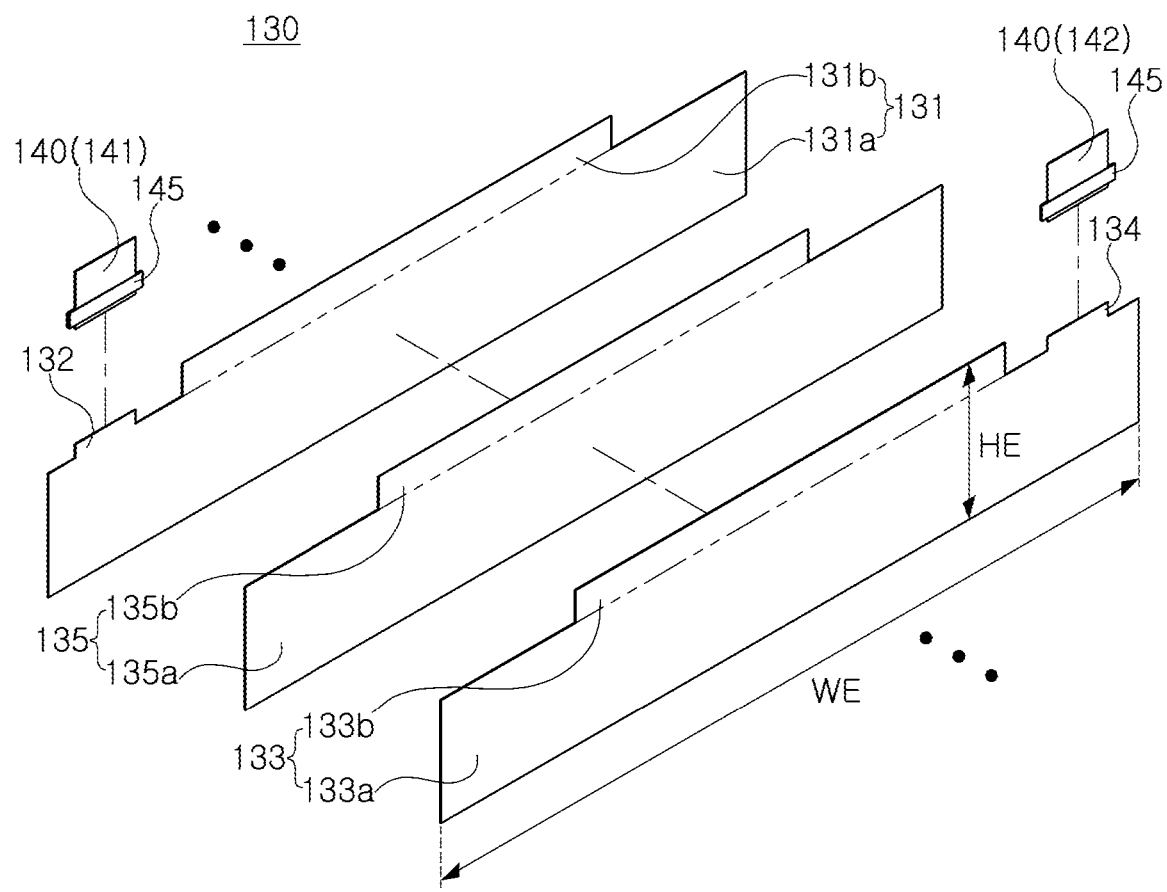
FIG. 7 is an exploded perspective view of an electrode assembly and electrode leads installed in the pouch (casing) illustrated in FIG. 5.

FIG. 5 is a perspective view illustrating the pouch-type battery cell 100 according to an embodiment of the present disclosure, FIG. 6 is an enlarged view of a square box portion of FIG. 5, FIG. 7 is an exploded perspective view of an electrode assembly 130 and electrode leads 140 installed in the pouch (casing) 101 illustrated in FIG. 5, and FIGS. 8 to 13 are views illustrating an example of a process for manufacturing the pouch-type battery cell 100 illustrated in FIG. 5.

Referring to FIGS. 5 to 7, the pouch-type battery cell 100 according to an embodiment of the present disclosure includes an electrode assembly 130 including a plurality of electrode plates 131 and 133, a pouch 101 accommodating the electrode assembly 130, and the electrode leads 140 connected to the electrode assembly 130 and exposed externally of the pouch 101.

Each battery cell 100 is configured as a pouch type secondary battery, and may have a form in which the electrode assembly 130 and an electrolyte are accommodated in the pouch (casing) 101. As an example, in an embodiment of the present disclosure, the pouch-type battery cell 100 may include a lithium ion (Li-ion) battery or a nickel metal hydride (Ni-MH) battery which is chargeable or dischargeable.

Referring to FIGS. 5 and 6, the pouch 101 may be divided into an electrode accommodation portion 110 and a sealing portion 120, and may be formed of a pouch film casing formed of a material such as aluminum. The electrode accommodation portion 110 is formed in a container shape to provide a rectangular internal space. An electrode assembly (130 in FIG. 7) and an electrolyte are accommodated in the internal space of the electrode accommodation portion 110. The electrode accommodation portion 110 has a shape corresponding to the electrode assembly 130 and has a shape slightly larger than that of the electrode assembly 130 to accommodate the electrode assembly 130.

The electrode accommodation portion 110 has a shape corresponding to the electrode assembly 130 to accommodate the electrode assembly 130. That is, the electrode accommodation portion 110 may include a body portion 111 having a greater width than height. The electrode accommodation portion 110 may also include an extension portion 115 extending in an up-down direction from a width-directional central portion of the body portion 111 and having a width narrower than the body portion 111. The extension portion 115 also has a height smaller than the height of the body portion 111. Accordingly, in the present embodiment, the electrode accommodation portion 110 may have a cuboid shape in which a first cuboid constituting the body portion 111 and a second cuboid forming the extension portion 115 are combined. When viewed from the side, the accommodation portion 110 may have a shape in which a quadrangle constituting one of the six faces of the body portion 111 and a quadrangle constituting one of the six faces of the extension portion 115 having a width narrower than that of the body portion 111 are combined. That is, from a side view, the electrode accommodation portion 110 may generally have a two-dimensional shape of '凸 (protrusion)' which is referred to herein as a quandrangle protrusion shape having eight sides. In addition, in order to form the battery cell 100 having the width greater than the height thereof, the width (W in FIG. 10) of the electrode accommodation portion 110 (i.e., the width W of the body portion 111) may be twice or more than the height (H in FIG. 10, which is the height of the body portion 111 plus the height of the extension portion 115) of the electrode accommodation portion 110.

The sealing portion 120 may be a portion to which at least a portion of the pouch 101 is bonded to seal the periphery of the electrode accommodation portion 110. The sealing portion 120 is formed in at least a portion of the periphery of the electrode accommodation portion 110 to seal the electrode assembly 110. Accordingly, the sealing portion 120 is formed in the form of a flange extending outward from the electrode accommodation portion 110 formed in the container shape and is disposed along at least a portion of an outer portion of the electrode accommodation portion 110. A heat-sealing method may be used to bond the pouch 101 to form the sealing portion 120, but is not limited thereto. In an embodiment of the present disclosure, the sealing portion 120 may include a first sealing portion 121 formed on both sides of the electrode accommodation portion 110 in the width direction and a second sealing portion 125 formed at an upper portion of the electrode accommodation portion 110.

Referring to FIG. 7, the electrode assembly 130 includes a plurality of electrode plates 131 and 133 and a separator 135 and is accommodated in the electrode accommodation portion 110 of the pouch 101. The electrode plates 131 and 133 may have sizes and shapes corresponding to those of the electrode accommodation portion 110, and since the electrode plates 131 and 133 are accommodated in the electrode accommodation portion 110, the size of the electrode accommodation portion 110 may be slightly larger than the electrode plates 131 and 133.

The electrode plates 131 and 133 include a sheet-shaped positive electrode plate 131 and a sheet-shaped negative electrode plate 133, and the electrode assembly 130 may be formed by stacking the positive electrode plate 131 and the negative electrode plate 133 such that wide surfaces thereof face each other, with the sheet-shaped separator 135 interposed therebetween. That is, the electrode assembly 130 includes a plurality of positive electrode plates 131, negative electrode plates 133, and separators 135, and has a structure in which the sheet-shaped positive electrode plate 131, the separator 135, the negative electrode plate 133, and the separator 135 are stacked in order. The positive electrode plate 131 and the negative electrode plate 133 may be formed as a structure in which an active material slurry is applied to a current collector, and the slurry is typically formed by stirring a granular active material, an auxiliary conductor, a binder, a plasticizer, etc. in a state in which a solvent is added thereto.

Referring to FIG. 7, the positive electrode plate 131 may include a positive electrode plate body portion 131a having a width greater than a height and positive electrode plate extension portion 131b extending from a width-directional central portion of the positive electrode plate body portion 131a in one direction (e.g., an up-down direction) and having a width narrower than that of the positive electrode plate body portion 131a. Also, the positive electrode plate 131 may include a positive tab 132 protruding in one direction (e.g., upwardly) of the positive electrode plate body portion 131a from one width-directional edge (e.g., left side) of the positive electrode plate body portion 131a and connected to the electrode lead 140 on one side.

Similar to the positive electrode plate 131, the negative electrode plate 133 may include a negative electrode plate body portion 133a having a width greater than a height and a negative electrode plate extension portion 133b extending from a width-directional central portion of the negative electrode plate body portion 133a in one direction (e.g., the up-down direction) and having a width narrower than the negative electrode plate body portion 133a. Also, the negative electrode plate 133 may include a negative tab 134 protruding in one direction (e.g., upwardly) of the negative electrode plate body portion 133a from the other width-directional edge (e.g., right side) of the negative electrode plate body portion 133a and connected to the electrode lead 140 on the other side.

That is, the positive electrode tab 132 and the negative electrode tab 134 may each have a shape protruding upwardly from both sides of the electrode assembly 130 in the width direction and may be connected to the electrode leads 140 corresponding to the positive electrode and the negative electrode, respectively.

The positive electrode plate 131 in which the positive electrode plate extension portion 131b and the positive electrode tab 132 are formed and the negative electrode plate 133 in which the negative electrode plate extension portion 133b and the negative electrode tab 134 are formed may be formed by preparing sheet-shaped electrode plate materials and performing a notching operation on the periphery of the electrode plate materials to correspond to the shapes of the positive electrode plate 131 and the negative electrode plate 133, respectively.

The separator 135 has a slightly larger size than that of the positive electrode plate 131 and the negative electrode plate 133 in order to electrically separate the positive electrode plate 131 and the negative electrode plate 133.

Referring to FIGS. 5 to 7, the electrode leads 140 (141 and 142) include a positive electrode lead 141 and a negative electrode lead 142 respectively connected to the positive electrode plate 131 and the negative electrode plate 133 of the electrode assembly 130. The positive electrode lead 141 may be connected to a plurality of positive electrode tabs 132 having a shape extending upwardly from one side of the positive electrode plate 131 in the width direction, and the negative electrode lead 142 may be connected to a plurality of negative electrode tabs 134 having a shape extending upwardly from the other side of the negative electrode plate 133 in the width direction. That is, the electrode lead 140 extends from both sides in the width direction of the body portion 111 of the electrode accommodation portion 110 to one side (e.g., in the up-down direction), respectively, so as to be connected to the electrode assembly 130 and is positioned outside the extension portion 115 of the electrode accommodation portion 110 in the width direction. Also, the electrode lead 140 may be exposed externally of the pouch 101 through the sealing portion 120. Meanwhile, the electrode lead 140 may be cut based on a cutting line CL after the sealing portion 120 is formed, so as not to be exposed externally of the pouch 101 more than necessary. In this case, a height (HL in FIG. 13) of the electrode lead 140 with respect to the cutting line CL may be lower than a height (HC in FIG. 13) of an outer portion of the pouch 101.

A process of manufacturing the pouch-type battery cell 100 illustrated in FIG. 5 and a specific structure of the pouch-type battery cell 100 are described with reference to FIGS. 8 to 13.

Figure 8:
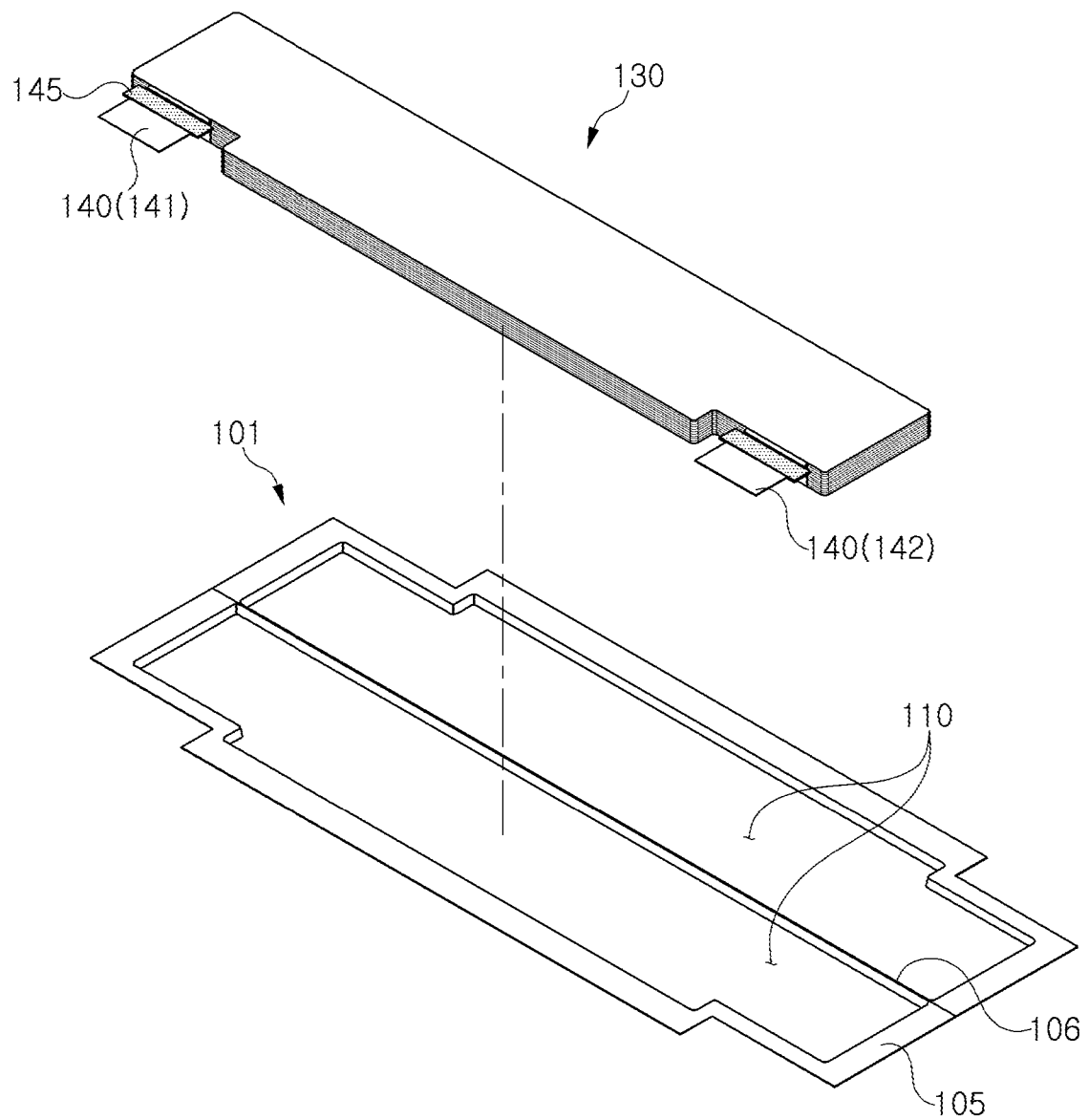
Figure 9:
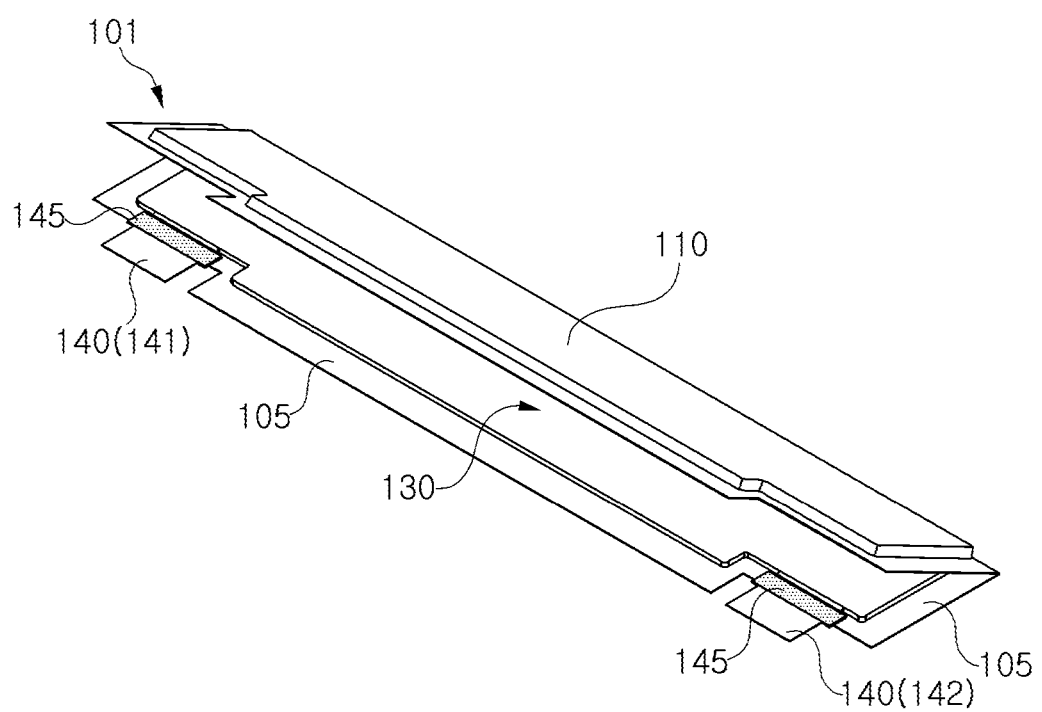
Figure 10:
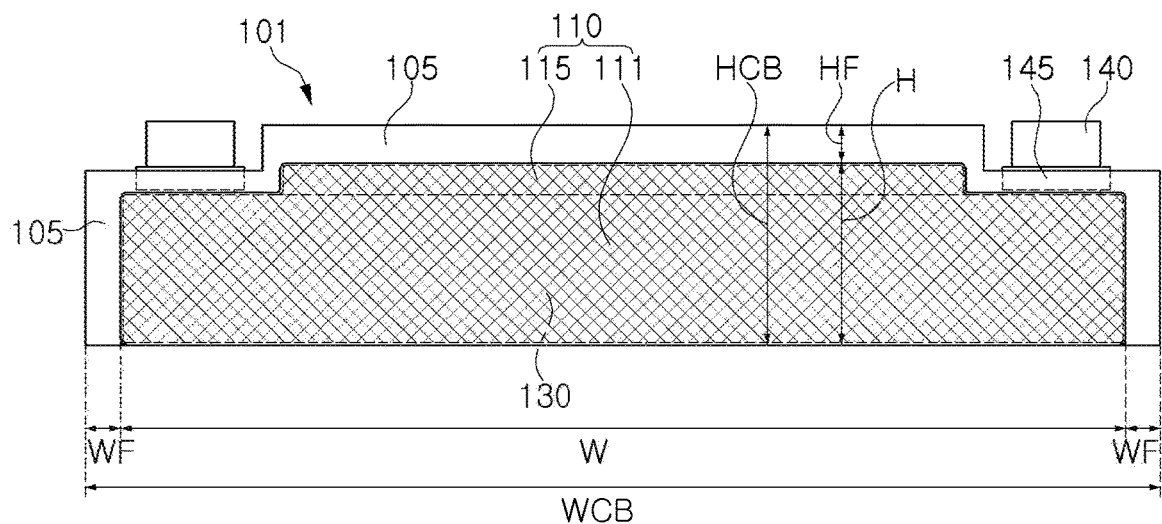
Figure 11:
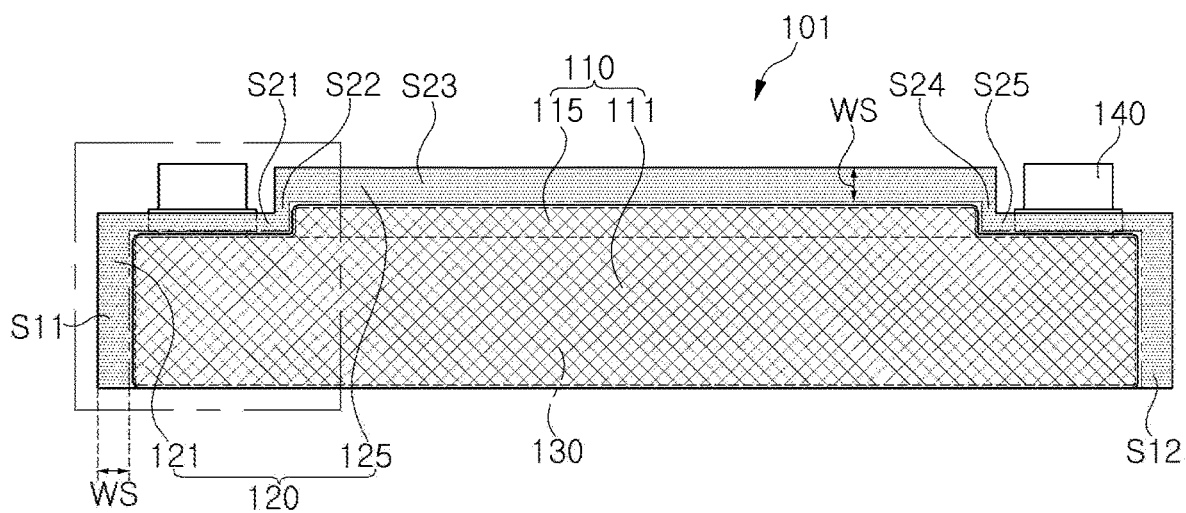
Figure 12:
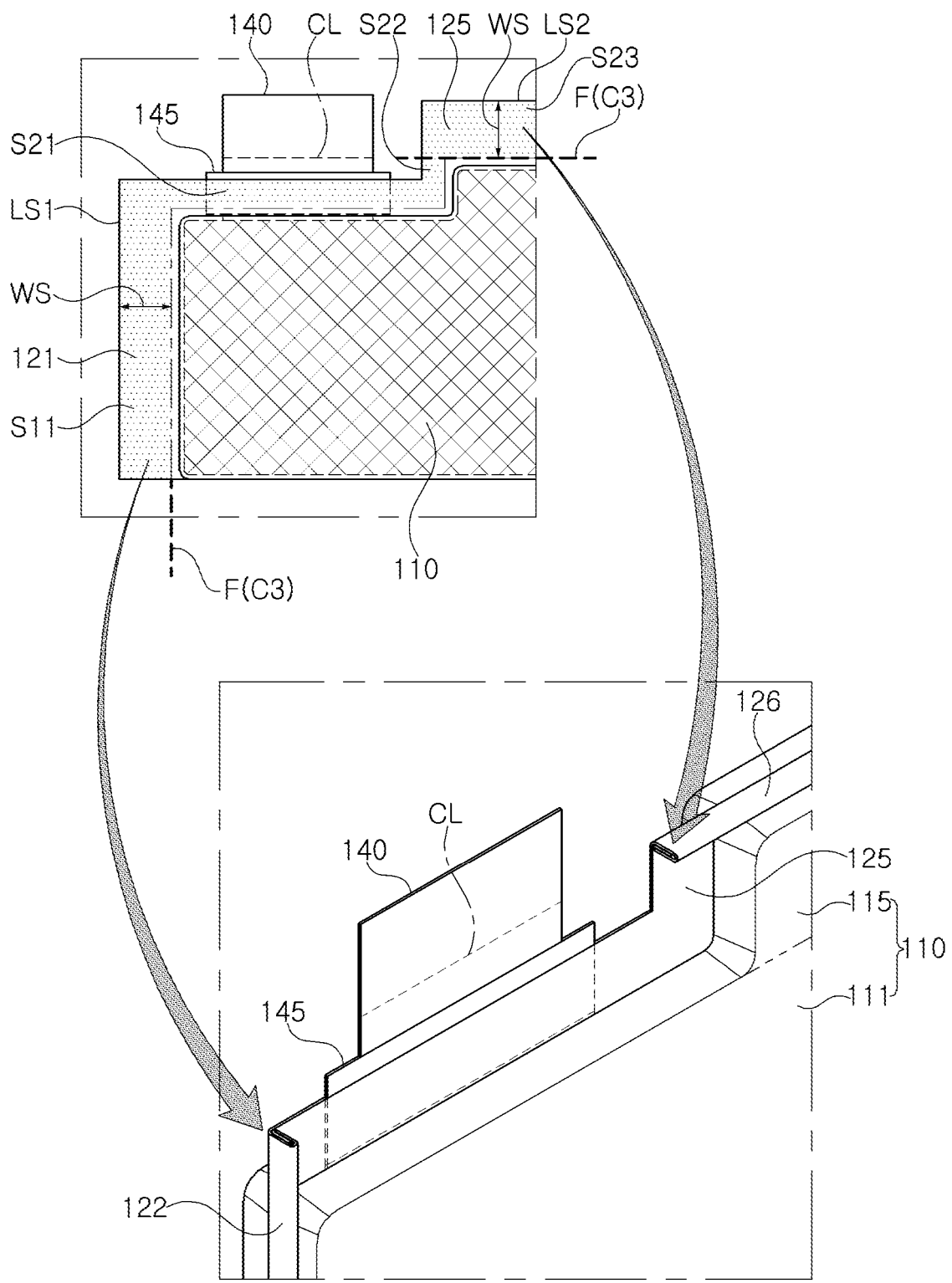
Figure 13:
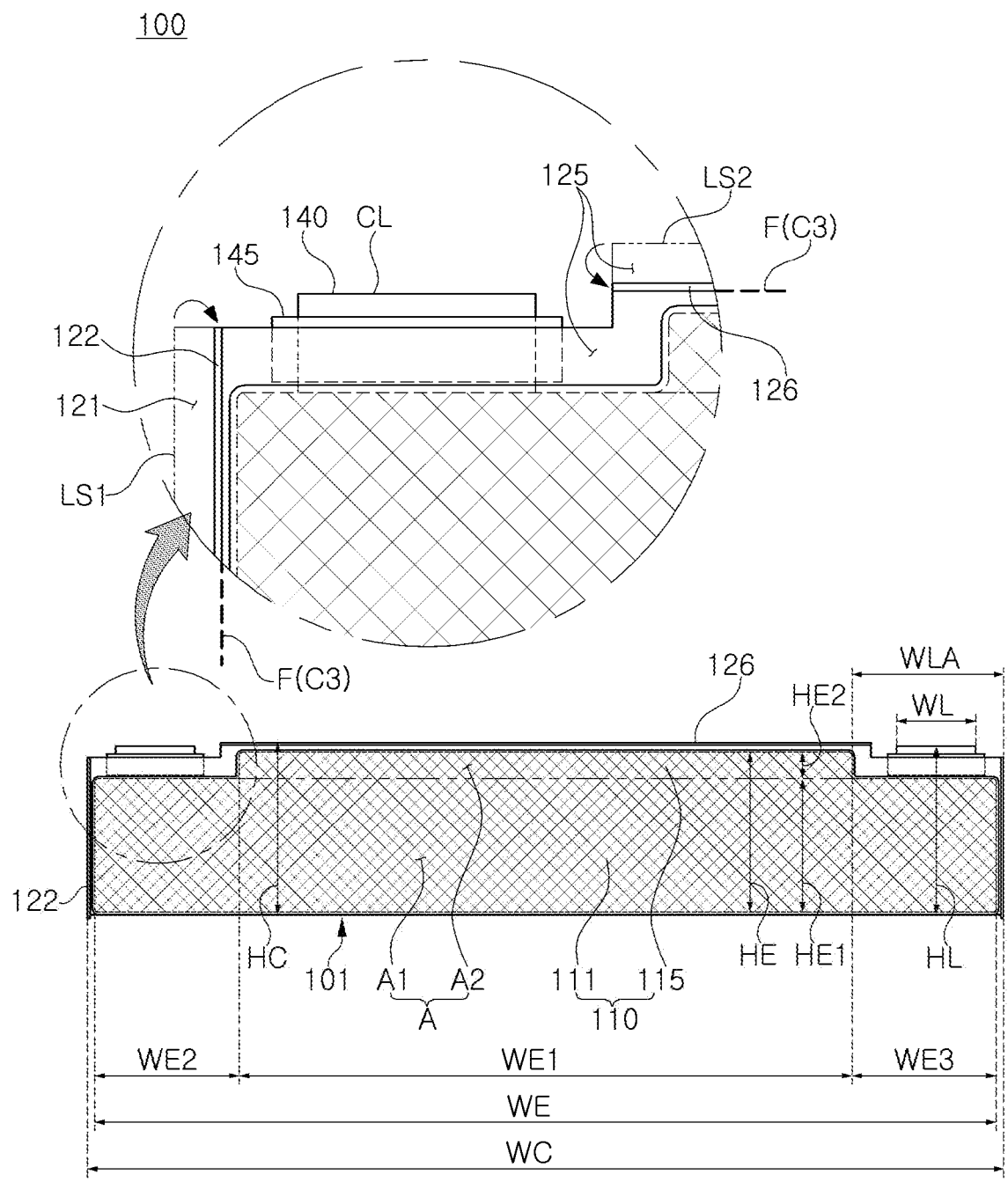

FIG. 8 shows schematically a process in which the electrode assembly 130 illustrated in FIG. 7 is stacked, the electrode tabs 132 and 134 are combined with the electrode leads 140 (141, 142), which are, then inserted into the pouch 101, and FIG. 9 is a perspective view illustrating a process in which the pouch 101 is folded in a state in which the electrode assembly 130 and the electrode leads 140 are accommodated in the pouch 101 as a subsequent process of FIG. 8. Also, FIG. 10 is a schematic view illustrating the side surface (large surface) of the pouch 101 in a state in which the pouch 101 is folded, FIG. 11 is a schematic view illustrating a state in which the sealing portion 120 is formed in the periphery of the electrode accommodation portion 110 with respect to the pouch 101 of FIG. 10, and FIG. 12 is a schematic diagram illustrating a process of forming first and second bending portions 122 and 126 in the sealing portion 120 of FIG. 11. FIG. 13 is a schematic diagram of the pouch-type battery cell 100 illustrating a final state in which the first and second bending portions 122 and 126 are formed in FIG. 12 and the end of the electrode lead 140 is cut along the cutting line CL.

First, as illustrated in FIG. 8, a pouch 101 in which a pair of electrode accommodation portions 110 is formed to accommodate the electrode assembly 130 is prepared, and the electrode assembly 130 and the electrode lead 140 are coupled to be accommodated in the electrode accommodation portions 110.

In the present embodiment, the pouch 101 may be formed such that a pair of electrode accommodation portions 110 is connected at a predetermined interval by forming a single pouch film casing. More specifically, the electrode accommodation portions 110 may be formed on one side and the other side, respectively, of a central portion 106 of the pouch film casing through a forming process. Here, when the pouch film casing is folded as illustrated in FIG. 9, the two electrode accommodation portions 110 form one space in which the electrode assembly 130 is accommodated. That is, the pair of electrode accommodation portions 110 may face each other to form a single space as a connecting portion, i.e., the central portion 106, is folded. A flange portion 105 may be formed in the periphery of the electrode accommodation portions 110.

In addition, before the electrode assembly 130 is accommodated in the electrode accommodation portion 110 of the pouch 101, the electrode assembly 130 and the electrode lead 140 are connected in advance. As illustrated in FIG. 7, a plurality of sheet-shaped positive electrode plates 131 and negative electrode plates 133 are stacked with a separator 135 interposed therebetween. That is, the positive electrode plate 131, the separator 135, and the negative electrode plate 133 are sequentially stacked. In addition, the plurality of positive electrode tabs 132 extending upwardly from one side in the width direction of the plurality of positive electrode plates 131 and the electrode leads 140 are connected, and the plurality of negative electrode plates 133 extending upwardly from the other side in the width direction of the plurality of negative electrode tab 134 and the electrode lead 140 are connected. The electrode lead 140 and the plurality of positive electrode tabs 132 or the plurality of negative electrode tabs 134 may be connected by welding.

Referring to FIG. 9, the pouch 101 is folded in a state in which the electrode assembly 130 is accommodated in the electrode accommodation portion 130 and the electrode lead 140 is exposed externally of the pouch 101.

FIG. 10 illustrates the side surface (large side) of the pouch 101 in the folded state. As illustrated in FIG. 10, an overall height of the pouch in the folded state, that is, a height HCB of the battery cell (pouch) before the formation of the second bending portion 126, is the sum of an overall height H of the electrode accommodation portion 110 and a height HF of the flange portion 105. In addition, an overall width of the pouch in a folded state, that is, a width WCB of the battery cell (pouch) before the formation of the first bending portion 122, is equal to the sum of an overall width W of the electrode accommodation portion 110 and widths WF of the flange portions 105 on both sides.

Next, as illustrated in FIG. 11, the sealing portion 120 is formed in abutting portions in the periphery of the electrode accommodation portion 110. The sealing portion 120 is a portion formed by bonding the pouch film casing on the outer portion of the electrode accommodation portion 110. However, as described above, when the pouch 101 is formed by forming one sheet of casing, it is not necessary to form the sealing portion 120 at the portion where the casing is folded. Therefore, in this embodiment, the sealing portion 120 may be formed on the outer portion of the electrode accommodation portion 110 and may be provided only on three sides among the top, bottom, left and right sides of the electrode accommodation portion 110, so that the sealing portion 120 may not be disposed on the bottom side (a lower side in FIGS. 10 and 11) of the outer portion of the electrode accommodation portion 110.

In addition, in the present embodiment, the sealing portion 120 may include a first sealing portion 121 formed on both sides of the electrode accommodation portion 110 in the width direction and a second sealing portion formed at an upper portion of the electrode accommodation portion 110.

Referring to FIG. 11, the first sealing portion 121 may include regions S11 and S12 respectively formed on both sides of the electrode accommodation portion 110 in the width direction and may have a predetermined width WS in the flange portion 105 of FIG. 10.

The second sealing portion 125 may be formed in both side regions S22 and S24 of the extension portion 115 of the electrode accommodation portion 110 in the width direction and upper regions S21 and S25 of portions positioned on both sides of the extension portion 115 of the body portion 111 in the width direction. Also, the second sealing portion 125 may be formed to have a predetermined width WS in the flange portion 105. Here, the width WS of the first sealing portion 121 and the width WS of the second sealing portion 125 may be set to be widths necessary for sealing the electrode accommodation portion 110. In addition, the width WS of portions of the first sealing portion 121 and the second sealing portion 125 in which the bending portions 122 and 126 to be described are formed may have a size required for the formation of the bending portions 122 and 126.

In addition, the electrode lead 140 may be exposed externally through the regions S21 and S25 of the second sealing portion 125 located on both sides of the extension portion 115 in the width direction in the body portion 111. Here, the electrode lead 140 may be covered by an insulating portion 145 so as to increase a sealing degree of the second sealing portion 125 at a position where the electrode lead 140 is drawn out and at the same time secure an electrical insulation state.

In addition, in the battery cell 100 of the present disclosure, in order to increase bonding reliability of the sealing portion 120 and reduce the area of the sealing portion 120, the sealing portion 120 may be bent (folded) at least once as illustrated in the enlarged view of FIG. 12 and FIG. 6.

More specifically, the pouch 101 may form the bending portions 122 and 126 by bending an area of the sealing portion 120 in which the electrode lead 140 is not disposed.

Referring to FIGS. 5, 6, 12, and 13, the first sealing portion 121 may include the first bending portion 122 bent at least once, and the second sealing portion 125 may include a second bending portion 126 bent at least once at an upper portion of the extension portion 115 to which the electrode lead 140 is not exposed.

In order to more reliably seal the sealing portion 120 and minimize the area of the sealing portion 120, at least one of the first bending portion 122 and the second bending portion 126 may be bent twice.

Referring to FIGS. 12 and 13, the first sealing portion 121 has a shape that extends from the electrode accommodation portion 110 to an end line LS1 of the first sealing portion 121 in the state before being bent.

Referring to FIG. 6, the first sealing portion 121 may be folded by 180° along a first bending line C1 and then folded again along a second bending line C2 to form the first bending portion 122. Also, the first bending portion 122 may have a structure in which it is further folded by a predetermined angle along a third bending line C3. In this case, a folding line F of FIG. 12 may correspond to any one of the bending lines C1 to C3 of FIG. 6. In addition, an inside of the first sealing portion 121 may be filled with an adhesive member AD, and the first sealing portion 121 may maintain the shape of the first bending portion 122 by the adhesive member AD. The adhesive member AD may be formed of an adhesive having high thermal conductivity. For example, the adhesive member AD may be formed of epoxy or silicon, but is not limited thereto. As described above, by forming the first bending portion 122 in the first sealing portion 121, a volume occupied by the first sealing portion 121 in the battery cell 100 may be reduced.

Referring to FIGS. 12 and 13, the second sealing portion 125 has a shape extending from the electrode accommodation portion 110 to an end line LS2 of the second sealing portion 125 in the state before being bent. Referring to FIG. 6, the second sealing portion 125 may be folded by 180° along a first bending line C1 and then folded again along a second bending line C2 to form the second bending portion 126. Also, the second bending portion 126 may have a structure in which it is further folded by a predetermined angle along a third bending line C3. In this case, a folding line F of FIG. 12 may correspond to any one of the bending lines C1 to C3 of FIG. 6. In addition, an inside of the second sealing portion 125 may be filled with an adhesive member AD, and the second sealing portion 125 may maintain the shape of the second bending portion 122 by the adhesive member AD. The adhesive member AD may be formed of an adhesive having high thermal conductivity. As described above, by forming the second bending portion 126 in the second sealing portion 125, a volume occupied by the second sealing portion 125 in the battery cell 100 may be reduced.

In addition, in order to form the second bending portion 126 at an upper portion of the extension portion 115 where the electrode lead 140 is not exposed, a step shape may be formed between the portion S21 formed at an upper portion of the body portion 111 and the portion S23 formed at an upper portion of the extension portion 115 in the second sealing portion 125. That is, the portion S23 of the second sealing portion 125 formed at the upper portion of the extension portion 115 is located at a position higher than the portion S21 of the second sealing portion 125 formed at an upper portion of the body portion 111. Therefore, both ends of the second sealing portion 125 formed at the upper portion of the extension portion 115 are open, without contacting other components, and thus the second bending portion 126 may be easily formed.

FIG. 13 illustrates a pouch-type battery cell 100 in the final state in which the first and second bending portions 122 and 126 are formed and the end of the electrode lead 140 is cut based on the cutting line CL in FIG. 12. As shown in FIG. 13, by forming the first and second bending portions 122 and 126, the outer height HC and the outer width WC of the battery cell may be minimized.

The electrode lead 140 may be cut based on the cutting line CL so as not to be exposed beyond an outer side of the pouch 101 more than necessary. In this case, a height HL of the electrode lead 140 with respect to the cutting line CL may be lower than an outer height HC of the battery cell. When the second bending portion 126 is formed, the height HL of the electrode lead 140 may be lower than the outer height HC of the second bending portion 126. In this manner, since the end of the electrode lead 140 has a height lower than the outer height HC of the pouch 101, that is, the outer height of the second bending portion 126, the electrode lead 140 does not protrude beyond an outer portion of the pouch 101. Accordingly, the energy density of the battery cell 100 per unit volume of may be improved.

Meanwhile, the pouch 101 used in an embodiment of the present disclosure is not limited to the formation of the pair of electrode accommodation portions 110 by forming a single pouch film casing as illustrated in FIG. 8, and the pouch 101 may also be formed by forming only a single electrode accommodation portion 110 in the pouch film casing. Also, the pouch 101 used in an embodiment of the present disclosure is not limited to the structure in which the sealing portion 120 is formed on three sides among the upper, lower, left, and right sides by folding a single pouch film casing as illustrated in FIGS. 5 to 13. For example, it is also possible to form the electrode accommodation portion 110 by overlapping two casings and to form the sealing portion 120 on all of the upper, lower, left and right sides around the electrode accommodation portion 110.

As described above, the positive electrode plate 131 includes a positive electrode plate body portion 131*a* and a positive electrode plate extension portion 131*b*, and the negative electrode plate 133 includes a negative electrode plate body portion 133*a* and a negative electrode plate extension portion 133*b*. In addition, the positive electrode plate 131 and the negative electrode plate 133 have sizes and shapes corresponding to each other.

Referring to FIGS. 7 and 13, an overall height HE of the electrode plates 131 and 133 including the positive electrode plate 131 and the negative electrode plate 133 corresponds to the sum of a height HE1 of the electrode plate body portions 131*a* and 133*a* and a height HE2 of the electrode plate extension portions 131*b* and 133*b* as shown in FIG. 13. Also, an overall width WE of the electrode plates 131 and 133 corresponds to the sum of a width WE1 of the electrode plate extension portions 131*b* and 133*b* and widths WE2, and WE3 of the portions of the electrode plate body portions 131*a* and 133*a* extending to both sides of the electrode plate extension portions 131*b* and 133*b*. Also, an overall area A of the electrode plates 131 and 133 corresponds to the sum of an area A1 of the electrode body portions 131*a* and 133*a* and an area A2 of the electrode plate extension portions 131*b* and 133*b*.

That is, in the battery cell 100 according to an embodiment of the present disclosure, since the electrode plate extension portions 131*b* and 133*b* extend in a space between the electrode leads 140, the area of the electrode plates 131 and 133 may be increased by the area A2 of the electrode plate extension portions 131*b* and 133*b*. Accordingly, energy density of the battery cell 100 per unit volume may be increased.

In addition, since the electrode accommodation portion 110 is formed to correspond to the size and shape of the electrode plates 131 and 133, a height, width, and area of the electrode accommodation portion 110 correspond to a height, width, and area of the electrode plates 131 and 133.

In this case, the overall width WE of the electrode plates 131 and 133 may have a size greater than or equal to twice the overall height HE of the electrode plates 131 and 133. Accordingly, the width (W in FIG. 10) of the electrode accommodation portion 110 corresponding to the electrode plates 131 and 133 may have a size greater than or equal to twice the height (H in FIG. 10) of the electrode accommodation portion 110. Similarly, in a state in which the bending portions 122 and 126 are formed, an outer width (an outer width of the battery cell in which the bending portions are formed) WC of the pouch 101 may be twice or more of an outer height (an outer height of the battery cell in which the bending portions are formed) HC of the pouch 101.

Figure 2:
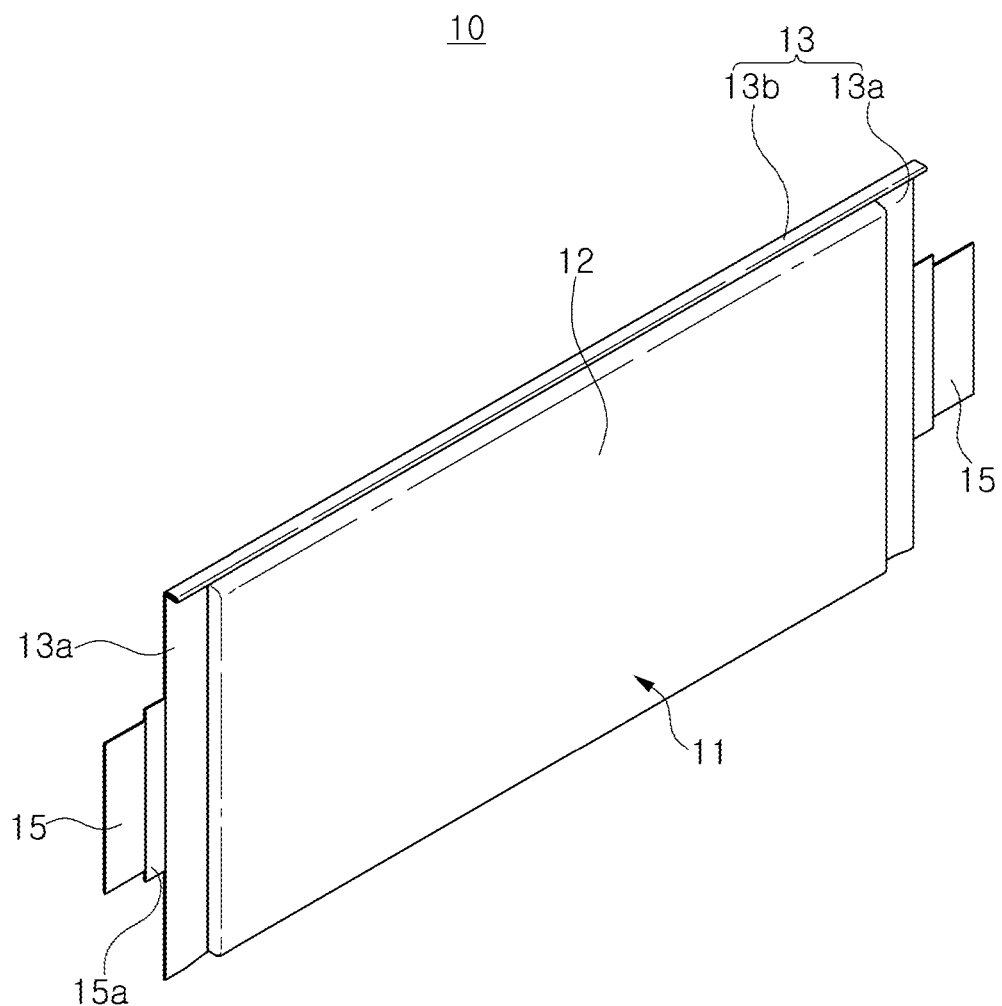
FIG. 2 is a perspective view of the pouch-type battery cell illustrated in FIG. 1.
Figure 3:
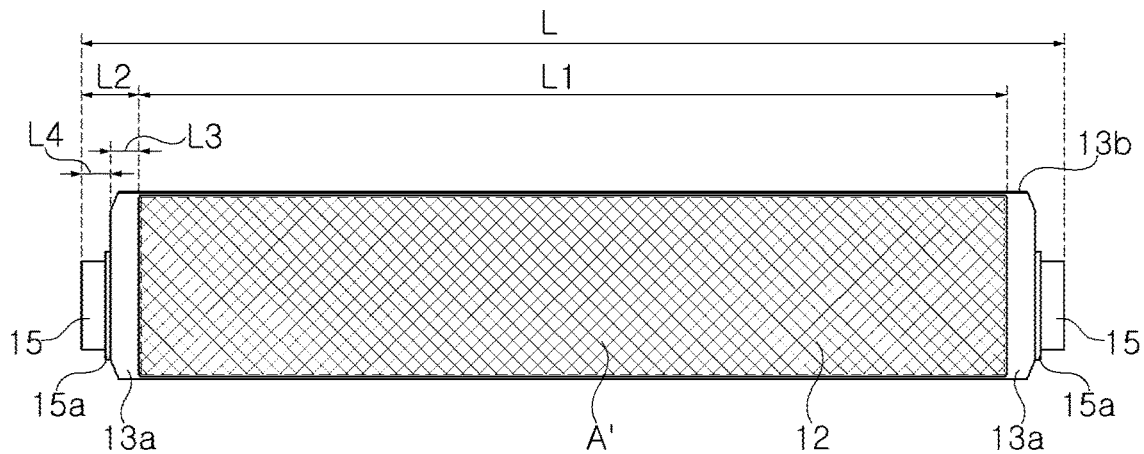
FIG. 3 is a schematic view of the pouch-type battery cell illustrated in FIG. 2.
Figure 4:
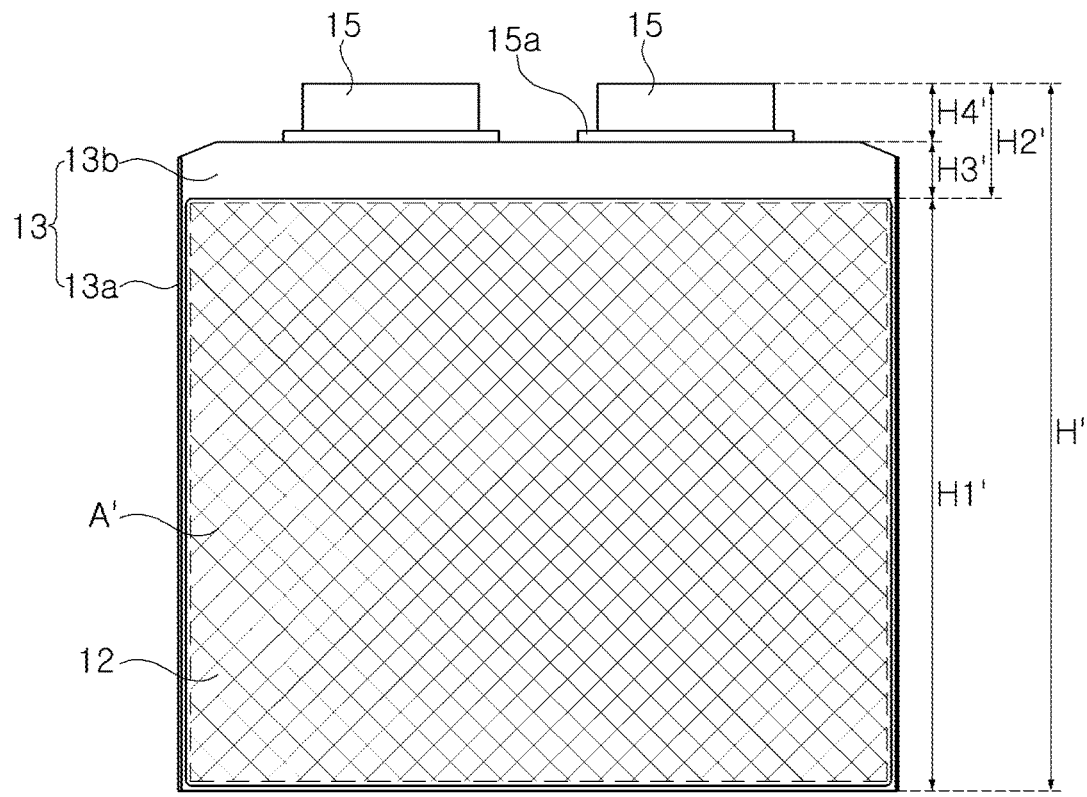
FIG. 4 is a schematic view illustrating a modified example of the pouch-type battery cell according to the related art.

In addition, according to an embodiment of the present disclosure, since the width WE of the electrode plates 131 and 133 is twice or more of the height HE of the electrode plates 131 and 133, it is possible to increase the width WL of the electrode lead 140. That is, since the electrode leads 140 have a shape extending upwardly from both sides of the electrode plates 131 and 133, respectively, and the electrode plate extension portions 131*b* and 133*b* are positioned between the both electrode leads 140, the width WL of the electrode lead 140 may extend to ⅓ of the width WE of the electrode plates 131 and 133. Accordingly, the width of the electrode lead 140 may be sufficiently wide compared to the related art pouch-type battery cell 10 (see FIGS. 2 and 3) having a structure in which the electrode leads 15 are exposed from both sides of the pouch 11. In this case, a minimum width of the electrode lead 140 is typically limited to 20 mm. That is, in an embodiment of the present disclosure, the width of the electrode lead 140 may be 20 mm or more, and in a state in which the bending portions 122 and 126 are formed, the width of the electrode lead 140 may be equal to or less than ⅓ of the width (the width of the battery cell) of the pouch 101.

In addition, the electrode lead 140 may have a thickness of 0.15 mm to 1 mm. In general, thicknesses of 0.3 mm for electrode leads formed of copper (Cu) (e.g., negative electrode leads) and 0.4 mm for electrode leads formed of aluminum (Al) (e.g., positive electrode leads) are widely used. A sectional area of the electrode lead may be increased by adjusting the thickness of the electrode lead 140 according to the width WL of the electrode lead 140.

Therefore, according to an embodiment of the present disclosure, both the width and thickness of the electrode lead 140 may be increased, or the width of the electrode lead 140 may be increased while the thickness of the electrode lead 140 is fixed. Therefore, it is possible to increase the sectional area (width×thickness) of the electrode lead 140, thereby reducing resistance occurring in the electrode lead 140. Accordingly, the battery cell 100 according to an embodiment of the present disclosure may reduce electrical resistance, which is suitable for rapid charging.

In addition, in a state in which the bending portions 122 and 126 are formed, a width-directional distance WLA from one end of the battery cell 100 in the width direction to the extension portion 115 of the electrode accommodation portion 110 may be equal to or smaller than the overall height (the overall height of the battery cell) HC of the pouch 101 in a state in which the bending portions 122 and 126 are formed. As such, when the width-directional distance WLA of the portion where the electrode leads 140 are formed is smaller than the overall height HC of the pouch 101, the width WE1 of the electrode plate extension portions 131*b* and 133*b* provided in electrode accommodation portion 110 between the electrode leads 140 may be increased. Therefore, according to an embodiment of the present disclosure, the area of the pouch provided between the electrode leads 140 may be used to increase electrical capacity of the battery cell.

As such, according to an embodiment of the present disclosure, since the battery cell 100 having a structure in which the electrode plates 131 and 133 are positioned even in the space between the electrode leads 140 as well as in the body portion 111 of the electrode accommodation portion 110 are stacked in plural and the height HL of the electrode lead 140 is configured to be lower than the outer height HC of the battery cell 100, energy density of the battery cell 100 per unit volume may be increased.

In the related art pouch-type battery cell 30 (see FIGS. 2 and 3) in which the electrode leads 35 are exposed from both sides of the electrode accommodation portion 32 in the width direction, both sides of the electrode accommodation portion 32 in the width direction cannot be used to install the electrode assembly. In contrast, in the battery module 200 according to an embodiment of the present disclosure, since almost all width of the battery cell 100 except for the first bending portion 122 may be sufficiently utilized for the installation of the electrode plates 131 and 133, energy density of the battery cell 100 per unit volume may be increased.

Also, according to an embodiment of the present disclosure, since it is possible to implement a battery cell 100 in which a width (length) is greater than a height of the battery cell 100, it is possible to reduce the height and increase the width in configuring the battery cell 100 to implement the same energy density.

Next, the battery module 200 according to an embodiment of the present disclosure will be described with reference to FIGS. 14 to 18.

Figure 14:
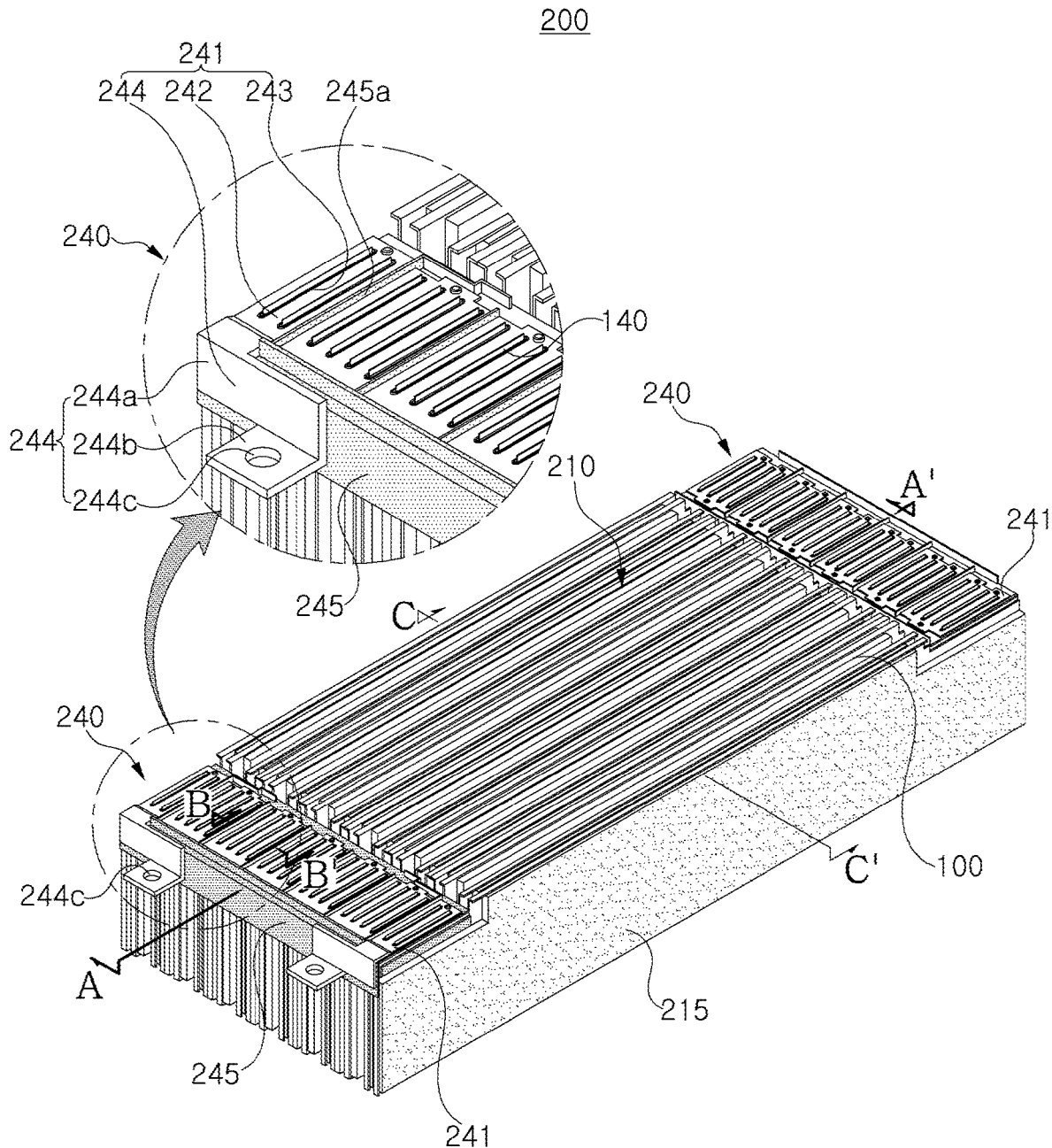
FIG. 14 is a perspective view illustrating an example of a battery module including the pouch-type battery cell illustrated in FIG. 7.
Figure 15:
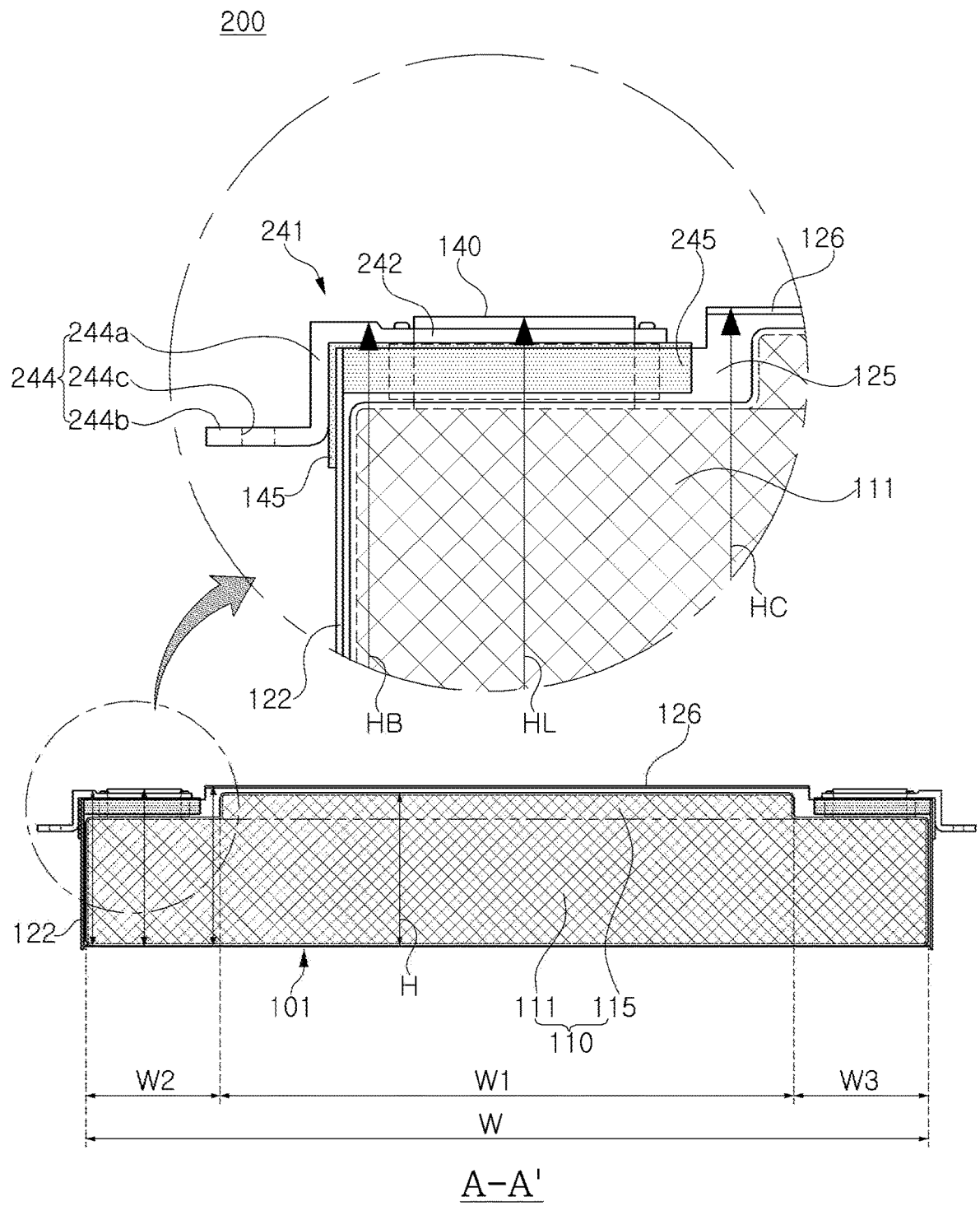
FIG. 15 is a cross-sectional view taken along line A-A' of FIG. 14.
Figure 16:
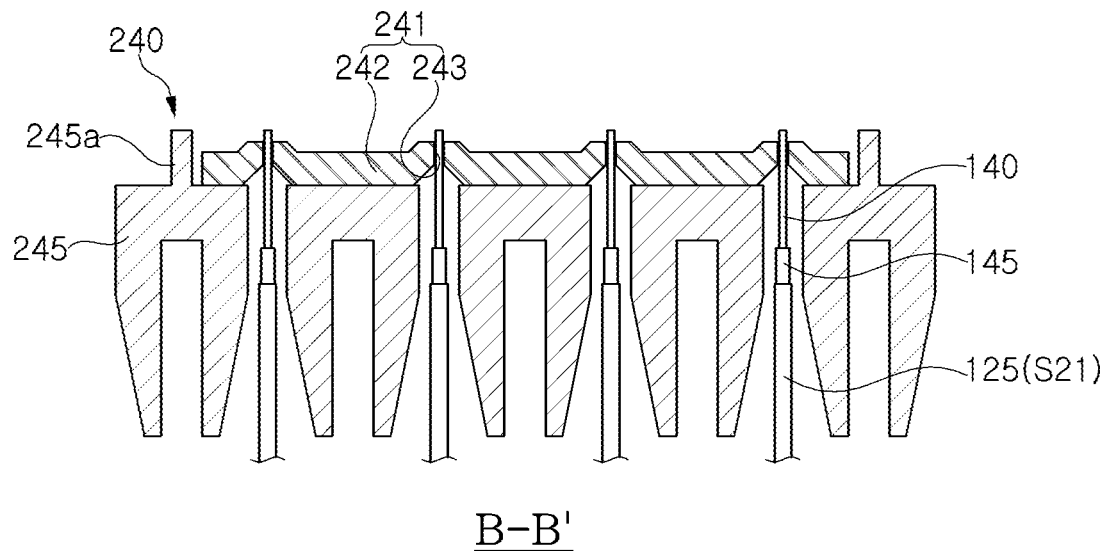
FIG. 16 is a cross-sectional view taken along line B-B' of FIG. 14.
Figure 17:
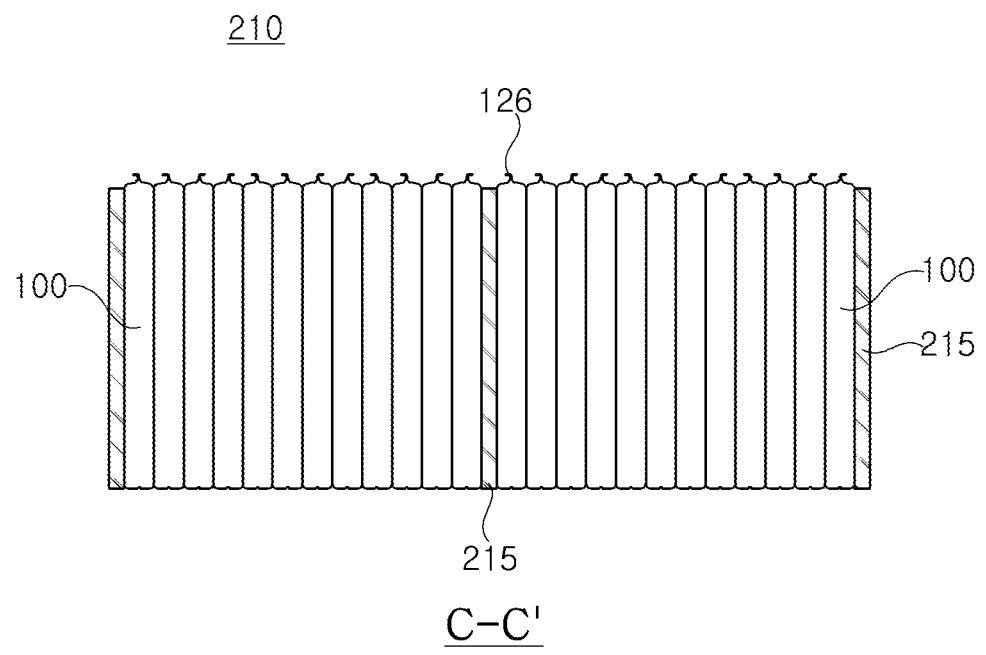
FIG. 17 is a schematic cross-sectional view taken along line C-C' in FIG. 14.
Figure 18:
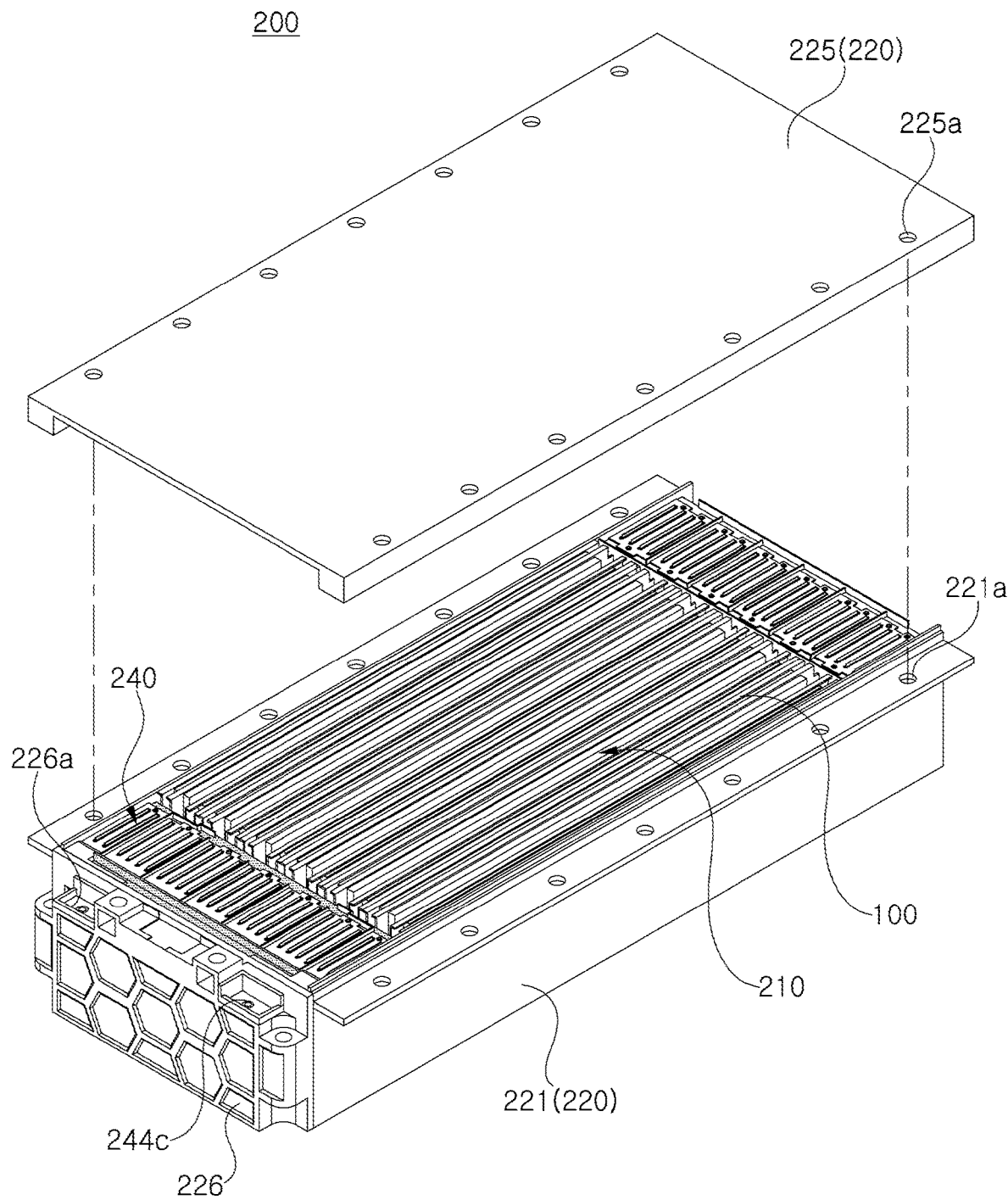
FIG. 18 is a perspective view illustrating a state in which a module housing and an end plate are added to the battery module illustrated in FIG. 14.

FIG. 14 is a perspective view illustrating an example of the battery module 200 including the pouch-type battery cell 100 illustrated in FIG. 7, FIG. 15 is a cross-sectional view taken along line A-A' of FIG. 14, FIG. 16 is a cross-sectional view taken along line B-B' of FIG. 14, FIG. 17 is a schematic cross-sectional view taken along line C-C' in FIG. 14, and FIG. 18 is a perspective view illustrating a state in which a module housing and an end plate are added to the battery module illustrated in FIG. 14.

The battery module 200 according to an embodiment of the present disclosure may include a cell stack 210 formed by stacking a plurality of pouch-type battery cells 100 and a bus bar assembly 240 and may further include a module housing 220.

As illustrated in FIG. 14, a plurality of pouch-type battery cells 100 may be stacked to form the cell stack 210. In order to maintain a shape of the cell stack 210, adjacent battery cells 100 may be attached to each other by a double-sided tape. The double-sided tape is attached to the side (large surface) of the battery cell 100 to fix the plurality of battery cells 100 to each other.

Referring to FIGS. 14 and 17, at least one buffer pad 215 may be disposed in the cell stack 210. The buffer pad 215 may be disposed between the battery cell 100 and a sidewall of the module housing 220, and may also be disposed between the battery cells 100. The buffer pad 215 may be compressed and elastically deformed when a specific battery cell 100 expands due to a swelling phenomenon, thereby suppressing expansion of the entire volume of the cell stack 210. To this end, the buffer pad 215 may be formed of a polyurethane material, but the material is not limited thereto.

The bus bar assembly 240 may include a conductive bus bar 241 electrically connected to the electrode lead 140 of the battery cell 100 and an electrically insulating support plate 245.

The bus bar 241 may include a conductive bus bar body 242 in which a through hole 243 through which the electrode lead 140 penetrates to be coupled in an up-down direction is formed.

The electrode leads 140 of the battery cell 100 extend vertically from both sides of the body portion 111 of the electrode accommodation portion 110 in the width direction and are connected to the electrode plates 131 and 133, respectively. Accordingly, the bus bar 241 electrically connected to the electrode leads 140 may move in the up-down direction of the battery cell 100 outside the extension portion 115 of the electrode accommodation portion 110 in the width direction so as to be coupled to the electrode leads 140. Each electrode lead 140 and the bus bar 241 may be coupled by welding in a state in which the electrode lead 140 penetrates through a through hole 243 of the bus bar body 242, that is, in a state in which the electrode lead 140 protrudes externally of the bus bar body 242.

In a state in which the electrode lead 140 and the bus bar 241 are coupled, an upper end portion of the electrode lead 140 protruding more than necessary externally of the bus bar 241 may be cut in a subsequent process. For example, the upper end portion of the electrode lead 140 may be cut based on the cutting line (CL in FIGS. 6, 12, and 13) after the battery cell 100 and the bus bar assembly 240 are coupled, but may also be cut before the bus bar assembly 240 is coupled to the battery cell 110. Accordingly, the end of the electrode lead 140 may have a height lower than the outer height HC of the battery cell 100, that is, the outer height of the second bending portion 126.

The support plate 245 is disposed between the bus bar body 242 and the electrode accommodation portion 110 to support the bus bar 241 and is formed so that the electrode lead 140 penetrates therethrough in the up-down direction. That is, after penetrating through the support plate 245 in the up-down direction, the electrode lead 140 may be exposed to the upper side of the bus bar 241 through a through hole 243 formed in the bus bar 241. In this case, the end of the electrode lead 140 may be coupled to the bus bar 241 with a non-bending structure, that is, in a linear shape, as illustrated in FIG. 16. Accordingly, a process of bending the electrode lead 140 may be omitted, and the electrode lead 140 and the bus bar 241 may be easily coupled. Meanwhile, partition protrusions 245*a* supporting the side surfaces of the bus bars 241 may be formed on the support plate 245.

In addition, the bus bar 241 may include a connection terminal portion 244 for electrical connection with the outside and may be electrically connected externally by connecting a connection mechanism such as a plug to a connection hole 244c. Here, the connection hole 244c has a hole shape penetrated in the up-down direction so that an external connection mechanism may be connected. In addition, the connection terminal portion 244 is connected to the bus bar body 242 to form the connection hole 244c penetrated in the up-down direction. The connection terminal portion 244 may include a first body 244a having a shape bent downward with respect to the bus bar body 242 and a second body 244b bent from the first body 244a to extend in a direction parallel to the bus bar body 242. The connection hole 244c may be provided in the second body 244b. The connection hole 244c may be exposed externally through an opening 226a of an end plate 226 and connected to an external connection mechanism, as will be described later.

Referring to FIG. 15, a height HB of the bus bar 241 may be lower than the outer height HC of the battery cell 100 in a state in which the bus bar 241 is coupled to the electrode lead 140. Here, since a portion in which a maximum height of the battery cell 100 is formed is the second bending portion 126, the height HB of the bus bar 241 may be lower than the outer height HC of the second bending portion 126 in a state in which the bus bar 241 is coupled to the electrode lead 2140.

In addition, in a state in which the bus bar 241 and the electrode lead 140 are coupled to each other, the electrode lead 140 is exposed to the outer side (upper side) of the bus bar 241. The height HL of the end of the electrode lead 140 may be lower than the outer height HC of the battery cell 100. Here, in the present disclosure and claims, the 'height (HL) of the end of the electrode lead 140' may refer to a height after the electrode lead 140 is cut based on the cutting line (CL in FIGS. 6, 12, and 13). In addition, the height HL of the end of the electrode lead 140 may be lower than the outer height HC of the second bending portion 126 in a state in which the bus bar 241 is coupled to the electrode lead 140.

As such, according to an embodiment of the present disclosure, the bus bar 241 or the electrode lead 140 is not exposed beyond an outer side of the battery cell 100. Therefore, according to an embodiment of the present disclosure, a separate space for installing the bus bar 241 at an upper portion outside the outer height of the battery cell 100 is not required, so that the height of the battery module 200 may be lowered.

In particular, recently, battery module end users (or consumers) (e.g., automobile manufacturers) are very interested in improving vehicle driving stability that may be obtained by lowering the overall height of the battery module 200. The battery module 200 according to an embodiment of the present disclosure may lower the height of the battery cell 100, and since the height of the battery module 200 may be lowered in a state in which the bus bar assembly 240 is coupled to the battery cell 100, the overall height of the battery module 200 may be sufficiently reduced to meet the demand of the battery module 200 demanders (it is possible to lower the height of the battery module 200 similarly to a height of the battery module including a can-type battery cell).

Meanwhile, the battery module 200 according to an embodiment of the present disclosure may further include a module housing 220 as illustrated in FIG. 18.

Referring to FIG. 18, the module housing 220 constitutes the exterior of the battery module 200 and is disposed outside the cell stack 210 formed by stacking a plurality of battery cells 100 to protect the battery cell 100 from an external environment. However, the battery module 200 according to an embodiment of the present disclosure does not necessarily include the module housing 220. For example, as illustrated in FIG. 14, it is also possible to mount a plurality of cell stacks 210 to which the bus bar assembly 240 is connected in the battery pack without the module housing 220.

The module housing 220 may have a pipe shape in which internal space for accommodating the battery cell 100 is formed and two ends are open in a length direction. For example, the module housing 220 may have a structure in a pipe shape by coupling a lower plate 221 having a U-shaped cross-section with one side open (in the present disclosure, the U-shaped cross-section includes an angled shape) and a cover portion 225 combined with the lower plate 221 to form an internal space accommodating the battery cell 100. Alternatively, the module housing 220 may have both end open mono-frame structure in which the lower plate 221 and the cover portion 225 are integrally formed.

Hereinafter, the module housing 220 formed by coupling the lower plate 221 and the cover portion 225 will be described as an example with reference to FIG. 18.

The cell stack 210 is disposed in the internal space of the module housing 220, and at least one surface constituting the module housing 220 may function as a heat dissipation plate dissipating heat generated in the battery cell 100 outwardly.

The lower plate 221 is formed of a material having high thermal conductivity, like a metal. For example, the lower plate 221 may be formed of an aluminum material. However, the material of the lower plate 221 is not limited thereto, and various materials may be used as long as the material has similar strength and thermal conductivity to those of metal, even if it is not a metal.

In addition, the cover portion 225 is configured to cover the open side of the lower plate 221. Like the lower plate 221, the cover portion 225 may be formed of a material having high thermal conductivity, like metal, or formed of a plastic material.

Also, coupling of the lower plate 221 and the cover portion 225 may be performed through a fastening member such as a bolt/nut, a screw, etc. in fastening holes 221a and 225a as illustrated in FIG. 18. However, the coupling of the lower plate 221 and the cover portion 225 may include, but not limited to, various methods, such as welding (e.g., laser welding, etc.), sliding method, or bonding.

Meanwhile, the module housing 220 may include an end plate 226 disposed on front and rear surfaces of the module housing 220 in a length direction to cover the open two ends. The end plate 226 is coupled to the lower plate 221 and the cover portion 225 to form an exterior of the module housing 220 together with the lower plate 221 and the cover portion 225.

A body of the end plate 226 may be formed of a metal such as aluminum and may be manufactured by a process such as die casting or extrusion/pressing. Also, the end plate 226 may have an opening 226a for exposing the connection hole 244c of the connection terminal portion 244 of the bus bar assembly 240 externally.

The end plate 226 may be coupled to the lower plate 221 and the cover portion 225 through a fixing member such as a screw or bolt. However, the coupling method of the end plate 226 is not limited thereto.

As set forth above, according to an embodiment, since the electrode assembly (electrode plate) is positioned even in the space between the electrode leads extending in an up-down direction from both sides of the body portion in the width direction, as well as in the body portion of the electrode accommodation portion and the electrode leads are not extending beyond an outer side of the pouch, energy density of the battery cell per unit volume may be improved.

In particular, in the related art pouch-type battery cell, the electrode leads are exposed in the width direction on both sides of the electrode accommodation portion in the width direction, making it impossible to use both sides of the electrode accommodation portion in the width direction to install the electrode assembly. In contrast, in the battery cell according to an embodiment of the present disclosure, since almost the entire width of the pouch excluding the bending portion is sufficiently utilized to installation of the electrode assembly, energy density of the battery cell itself per unit volume may be increased.

In addition, according to an embodiment of the present disclosure, since it is possible to implement a battery cell having a wide width in which width (length) is greater than a height, energy density of the battery cell per unit volume may be improved, while the height of the battery cell is lowered.

Also, according to an embodiment of the present disclosure, since the electrode leads are exposed in the up-down direction in a long-width battery cell having a width more than twice the height, the width of the electrode leads may be sufficiently large. Therefore, according to an embodiment of the present disclosure, a cross-sectional area (width× thickness) of the electrode lead may be increased to reduce resistance occurring in the electrode lead, thereby obtaining an advantageous effect for rapid charging of battery cells and battery modules.

While example embodiments have been shown and described above, it will be apparent to those skilled in the art that modifications and variations could be made without departing from the scope of the present disclosure as defined by the appended claims.

What is claimed is:

1. A pouch-type battery cell comprising:
    an electrode assembly in which a plurality of positive electrode plates and negative electrode plates are stacked with a separator therebetween;
    a pouch having at least one electrode accommodation portion accommodating the electrode assembly therein and a sealing portion for sealing the electrode assembly in at least a portion of a periphery of the electrode accommodation portion; and
    electrode leads electrically connected to the electrode assembly and including a positive electrode lead and a negative electrode lead exposed externally of the pouch through the sealing portion,
    wherein the electrode accommodation portion includes a body portion of which a width is greater than a height thereof and an extension portion extending from a central portion of the body portion in a width direction to one side and having a width narrower than the width of the body portion, the electrode leads are disposed outside the extension portion in the width direction, and a height of an upper end of the electrode leads from a bottom side of the body portion is lower than a height of an outer portion of the pouch from the bottom side of the body portion in a height direction such that the electrode leads do not protrude beyond the outer portion of the pouch in the height direction, the height direction being a direction in which the electrode leads are exposed externally of the pouch.

2. The pouch-type battery cell of claim 1, wherein the sealing portion includes a first sealing portion formed on both side portions of the body portion of the electrode accommodation portion in the width direction and a second sealing portion formed on an upper portion of the electrode accommodation portion and on both side portions of the extension portion in the width direction.

3. The pouch-type battery cell of claim 2, wherein the second sealing portion includes a first part and a second part formed on both side portions of the extension portion in the width direction, respectively, a third part formed on an upper portion of the extension portion, and a fourth part and a fifth part on upper portions of the body portion positioned on both sides of the extension portion in the width direction, respectively.

4. The pouch-type battery cell of claim 1,
    wherein the at least one electrode accommodation portion includes two accommodation portions connected by a connecting portion disposed between the pair of the two electrode accommodation portions,
    wherein the connecting portion is folded and the electrode accommodation portions face each other,
    wherein the sealing portion is formed in the periphery of the electrode accommodation portions by abutting portions of the electrode accommodation portions, and
    wherein the sealing portion is not formed in a folded portion in the periphery of the electrode accommodation portion.

5. The pouch-type battery cell of claim 3, wherein the first sealing portion includes a first bending portion, bent at least once along a first line, and the second sealing portion includes a second bending portion, bent at least once along a second line perpendicular to the first line, at an upper portion of the extension portion.

6. The pouch-type battery cell of claim 5, wherein the height of the upper end of the electrode leads from the bottom side of the body portion is lower than a height of the second bending portion from the bottom side of the body portion.

7. The pouch-type battery cell of claim 5, wherein the second sealing portion has a step shape formed between a portion formed at an upper portion of the body portion and a portion formed at an upper portion of the extension portion.

8. The pouch-type battery cell of claim 7, wherein the electrode leads are exposed externally of the pouch through the second sealing portion formed at the upper portion of the body portion.

9. The pouch-type battery cell of claim 5, wherein at least one of the first bending portion and the second bending portion has a twice bent shape.

10. The pouch-type battery cell of claim 1, wherein the width of the electrode accommodation portion is greater than twice the height of the electrode accommodation portion.

11. The pouch-type battery cell of claim 1, wherein a width of the pouch-type battery cell is greater than twice a height of the pouch-type battery cell.

12. The pouch-type battery cell of claim 11, wherein a width of the electrode leads is equal to or greater than 20 mm and equal to or less than ⅓ of the width of the pouch-type battery cell.

13. The pouch-type battery cell of claim 11, wherein a thickness of the electrode leads ranges from 0.15 mm to 1 mm.

14. The pouch-type battery cell of claim 11, wherein a width-directional distance from one end of the battery cell in the width direction to the extension portion has a value equal to or smaller than an overall height of the pouch-type battery cell.

15. The pouch-type battery cell of claim 1,
wherein the positive electrode plates, the negative electrode plates, and the separator each have a sheet shape and are stacked to each other to form the electrode assembly,
wherein each of the positive electrode plates includes a positive electrode tab protruding upwardly from an upper portion on one side in the width direction and connected to the positive electrode lead on one side, and
wherein each of the negative electrode plates includes a negative electrode tab protruding upwardly from an upper portion on the other side in the width direction and connected to the negative electrode lead on the other side.

16. The pouch-type battery cell of claim 15, wherein
each of the positive electrode plates includes a positive electrode plate body portion having a width greater than a height and a positive electrode plate extension portion extending to one side from a central portion of the positive electrode plate body portion in the width direction and having a width narrower than that of the positive electrode plate body portion, and
each of the negative electrode plates includes a negative electrode plate body portion having a width greater than a height and a negative electrode plate extension portion extending to one side from a central portion of the negative electrode plate body portion in the width direction and having a width narrower than that of the negative electrode plate body portion.

17. A battery cell comprising:
an electrode assembly;
a pouch enclosing the electrode assembly, the pouch including two identical electrode accommodation portions, a connecting portion connecting the accommodation portions, and a sealing portion sealing a periphery of the pouch around the electrode assembly; and
positive and negative electrode leads exposed externally of the single film pouch through the sealing portion,
wherein the pouch has a body portion of which a width is greater than a height of the body portion and an extension portion extending in a height direction from a central portion of the body portion in a width direction and having a width narrower than the width of the body portion,
wherein the electrode leads are extending in the height direction out from the body portion, and a height of an upper end of each of the electrode leads from a bottom side of the body portion is lower than a height of an upper end of the extension portion of the pouch from the bottom side of the body portion in the height direction such that the electrode leads do not protrude beyond the outer portion of the pouch in the height direction, the height direction being a direction in which the electrode leads are exposed externally of the pooch.

18. The battery cell of claim 17,
wherein the connecting portion is disposed centrally between the pair of electrode accommodation portions,
wherein the electrode assembly has a body portion and an extension portion having shapes that are complimentary to the shapes of the body portion and extension portion of the pouch, respectively, so that the electrode assembly is tightly enclosed inside the pouch.

* * * * *